United States Patent
Mullins et al.

(10) Patent No.: US 10,645,337 B1
(45) Date of Patent: May 5, 2020

(54) VIDEO LINE INVERSION FOR REDUCING IMPACT OF PERIODIC INTERFERENCE SIGNALS ON ANALOG VIDEO TRANSMISSION

(71) Applicant: Analog Devices International Unlimited Company, Limerick (IE)

(72) Inventors: Sean M. Mullins, Limerick (IE); Seamus Ryan, Nenagh (IE); Pablo Ventura, Valencia (ES); Isaac Molina Hernandez, Valencia (ES)

(73) Assignee: Analong Devices International Unlimited Company, Limerick (IE)

( * ) Notice: Subject to any disclaimer, the term of this patent is extended or adjusted under 35 U.S.C. 154(b) by 0 days.

(21) Appl. No.: 16/398,575

(22) Filed: Apr. 30, 2019

(51) Int. Cl.
    *H04N 7/083*      (2006.01)
    *H04N 5/50*      (2006.01)
    *H04N 5/208*      (2006.01)
    *H04N 5/213*      (2006.01)

(52) U.S. Cl.
    CPC ............ *H04N 7/083* (2013.01); *H04N 5/208* (2013.01); *H04N 5/213* (2013.01); *H04N 5/50* (2013.01)

(58) Field of Classification Search
    CPC .......... H04N 7/083; H04N 5/213; H04N 5/50; H04N 5/208
    See application file for complete search history.

(56) References Cited

U.S. PATENT DOCUMENTS

| | | | | | |
|---|---|---|---|---|---|
| 3,527,877 | A | * | 9/1970 | Walker | H04N 7/171 380/222 |
| 3,676,589 | A | * | 7/1972 | Jetzt | H04N 5/14 348/607 |
| 3,924,060 | A | * | 12/1975 | Bedford | H04N 7/081 348/486 |
| 4,019,201 | A | * | 4/1977 | Hartung | H04N 7/1716 380/235 |
| 4,051,532 | A | * | 9/1977 | Hilbert | H04N 7/08 348/473 |

(Continued)

OTHER PUBLICATIONS

*Understanding Analog Video Signals*, Maxim Integrated, Tutorial 1184, Sep. 28, 2002, 14 pages.

(Continued)

*Primary Examiner* — Jefferey F Harold
*Assistant Examiner* — Humam M Satti
(74) *Attorney, Agent, or Firm* — Patent Capital Group

(57) ABSTRACT

Disclosed herein are systems and methods that use video line inversion for reducing impact of periodic interference signals on analog transmission of video signals over wired links/connections. In one aspect of the present disclosure, in certain circumstances, a transmitter may be configured to perform video line inversion on a certain subset of video lines of a video signal prior to transmitting the video signal to the receiver, and a receiver may be configured to perform a corresponding inversion for the same subset of video lines of the video signal received at the receiver. Such video line inversion performed by the transmitter and the receiver may advantageously allow reducing or eliminating the impact of periodic interference signals that might affect the video signal during transmission, resulting in an improved quality of the video rendered at the receiver side.

20 Claims, 9 Drawing Sheets

(56) References Cited

U.S. PATENT DOCUMENTS

| | | | | |
|---|---|---|---|---|
| 4,398,210 A * | 8/1983 | Liu | ..................... | H04N 5/213 348/607 |
| 5,025,312 A * | 6/1991 | Faroudja | ................... | H04N 5/21 348/620 |
| 5,113,439 A * | 5/1992 | Hashimoto | ............ | H04N 7/102 348/607 |
| 5,315,385 A * | 5/1994 | Reime | ..................... | H04N 7/08 348/21 |
| 5,519,454 A * | 5/1996 | Willis | ..................... | H04N 5/21 348/663 |
| 6,184,919 B1 * | 2/2001 | Asprey | ..................... | H03F 1/22 333/25 |
| 6,327,709 B1 * | 12/2001 | Ovadia | ............. | H04L 25/03343 348/192 |
| 6,335,718 B1 * | 1/2002 | Hong | ................. | H04L 25/4915 345/100 |
| 6,546,149 B1 * | 4/2003 | Ruggiero | ................. | H04N 5/21 348/E5.077 |
| 7,106,385 B1 * | 9/2006 | Keen | ......................... | H04N 5/21 348/241 |
| 7,508,451 B2 | 3/2009 | Sheng et al. | | |
| 7,639,309 B2 | 12/2009 | Zhong | | |
| 7,932,955 B2 | 4/2011 | Zhong et al. | | |
| 8,040,437 B2 | 10/2011 | Zhong | | |
| 8,212,933 B2 | 7/2012 | Zhong | | |
| 9,554,021 B2 | 1/2017 | Kim et al. | | |
| 2002/0180891 A1 | 12/2002 | Lindsey | | |
| 2003/0058229 A1 * | 3/2003 | Kawabe | ................. | G09G 3/342 345/204 |
| 2004/0091033 A1 * | 5/2004 | Chen | ....................... | H01Q 3/22 375/226 |
| 2005/0174487 A1 * | 8/2005 | O'Connell | ................ | H04N 5/08 348/525 |
| 2008/0158433 A1 | 7/2008 | Yun et al. | | |
| 2008/0297462 A1 * | 12/2008 | Hsiung | ................ | G09G 3/3406 345/102 |
| 2010/0225820 A1 | 9/2010 | Yun et al. | | |
| 2011/0043509 A1 * | 2/2011 | Lee | ........................ | G09G 5/005 345/211 |
| 2012/0033722 A1 * | 2/2012 | Varadarajan | .............. | H04B 3/46 375/227 |
| 2013/0169695 A1 * | 7/2013 | Hyeon | ................ | G09G 3/3208 345/690 |
| 2015/0350595 A1 | 12/2015 | Chen | | |

OTHER PUBLICATIONS

Bradley et al., *Bulk Current Injection Testing of Cable Noise Reduction Techniques, 50 kHz to 400 MHz*, http://ntrs.nasa.gov/search.jsp?R=20090030527 Mar. 5, 2019, 6 pages.

* cited by examiner

VIDEO LINE INVERSION FOR REDUCING IMPACT OF PERIODIC INTERFERENCE SIGNALS ON ANALOG VIDEO TRANSMISSION

TECHNICAL FIELD OF THE DISCLOSURE

The present disclosure relates to the field of video transmission, and in particular to analog video transmission.

BACKGROUND

Video-based applications which rely on real-time video information acquisition, such as automotive infotainment, automotive driver assistance systems (ADAS), self-driving vehicles and security surveillance systems, generally involve the capture and generation of video data by one or more cameras. Such cameras may include, for example, charge-coupled devices (CCDs), complementary metal-oxide-semiconductor (CMOS) image sensors, or any other suitable video capturing devices which, broadly speaking, translate photons incident thereon into digital (raw or pixel) video data. In such applications, the video data will usually have to be transmitted in real-time from the camera to other devices for processing. Such devices may include, for example, electronic control units (ECUs) or components in communications or alerting systems. Such devices may, for example, execute specialized software to perform processing and analytical tasks based on the acquired image and/or video data and provide outputs accordingly. The combination of layers of transmission infrastructure enabling the transfer of the data between the camera and the video data receiving device/processor may be referred to as a "video link" or a "camera link."

A variety of factors can affect the cost, quality and robustness of a video link. Physical constraints such as space/surface area and also regulations can pose further constraints to the video link requirements or specifications, and thus trade-off and ingenuity will have to be exercised.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
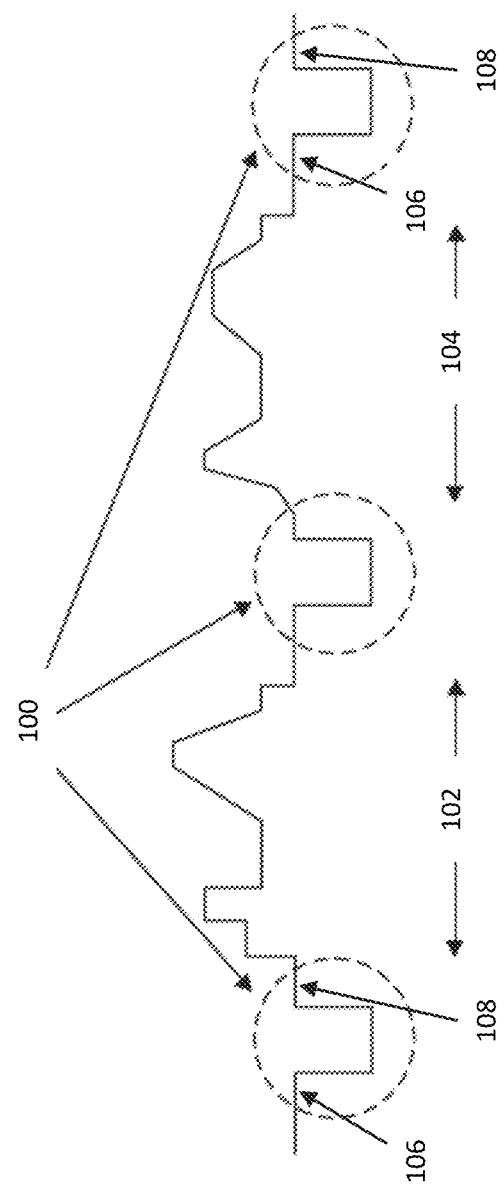
FIG. 1 is a schematic depiction of an example video signal, according to some embodiments of the present disclosure.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

Disclosed herein are systems and methods that use video line inversion for reducing impact of periodic interference signals (e.g., electromagnetic interference (EMI)) on analog transmission of video signals over wired links/connections. Such systems and methods may be particularly suitable for, but are not limited to, being used in a vehicle (where the term "vehicle" includes not only wheeled vehicle such as a car, a truck, or a bus, but also includes an airplane, an aircraft, or a spacecraft, for example), in a surveillance system, or in any other environment where a transmitter, placed at one location within such an environment (e.g., within a vehicle), and a receiver, placed at another location within such an environment, may need to communicate, in analog format, video signals and other data with one another over a wired link. Video signals may, e.g., be acquired by an image sensor in a camera that is communicatively coupled to the transmitter. Furthermore, while this disclosure mainly describes video links and video signals, video line inversion as described herein is also applicable to image signals or any combination of video and image signals, transmitted over an analog transmission channel.

In one aspect of the present disclosure, a video system includes a transmitter configured to transmit an analog video signal to a receiver. In certain circumstances, a transmitter may be configured to perform video line inversion on a certain subset of video lines of a video signal prior to transmitting the video signal to the receiver, and a receiver may be configured to perform a corresponding inversion for the same subset of video lines of the video signal received at the receiver. Such video line inversion performed by the transmitter and the receiver may advantageously allow reducing or eliminating the impact of periodic interference signals that might affect the video signal during transmission, resulting in an improved quality of the video rendered at the receiver side. For example, a receiver may be configured to receive a first portion of a video signal transmitted by a transmitter over the video link and determine a phase difference between a noise signal in a first video line of the first portion of the video signal and the noise signal in a second video line of the first portion of the video signal. Such a phase difference is indicative of a line-to-line phase difference (i.e., a phase difference from one video line to the next, consecutive, video line) in the noise signal in the first portion of the video signal. When the phase difference is determined to be within a predefined range, the receiver may be configured to modify a second portion of the video signal received by the receiver by inverting a subset of a plurality of video lines of the second portion of the video signal, after which the receiver may render the received video signal for display.

As used herein, the first and second portions of a video signal refer to different portions of a given video signal being sent from the transmitted to the receiver. Namely, the first portion is the portion of the video signal that the receiver may use to determine whether video line inversion may be beneficial, e.g., based on the noise signal phase difference determined for the first portion of the video signal received at the receiver. On the other hand, the second portion is the portion of the video signal that was transmitted with the transmitter implementing video line inversion, e.g., in response to the receiver indicating to the transmitter that such video line inversion would be beneficial. Transmitter performing video line inversion on a certain subset of video lines of a video signal (namely, on a certain subset of video lines of the second portion of the video signal) prior to transmitting the video signal to the receiver, and receiver performing a corresponding video line inversion for the same subset of video lines of the video signal received at the receiver may advantageously allow reducing or eliminating the impact of periodic interference signals that might affect the video signal during transmission. In some embodiments, line inversion on the transmitter and the receiver sides may be performed digitally (i.e., the line inversion may be applied to digital signals).

Other aspects of the present disclosure provide methods for operating such a system, as well as computer-readable storage media storing instructions which, when executed by a hardware processor, cause the processor to carry out the methods of using video line inversion to reduce the impact of periodic interference on analog transmission of video signals.

As will be appreciated by one skilled in the art, aspects of the present disclosure, in particular aspects of implementing video line inversion as proposed herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing video transmission systems, in particular, to the existing analog video transmission systems, including transmitters, receivers, and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Other features and advantages of the disclosure will be apparent from the following description and the claims.

Analog Video Transmission

For purposes of illustrating video line inversion techniques, described herein, it might be useful to first understand phenomena that may come into play in analog video transmission. The following foundational information may be viewed as a basis from which the present disclosure may be properly explained. Such information is offered for purposes of explanation only and, accordingly, should not be construed in any way to limit the broad scope of the present disclosure and its potential applications.

In systems requiring the transfer of video data between system elements (e.g., between an image sensor and a processor implemented at a certain distance from the image sensor), such as surround view ADAS or (security) surveillance systems, the video data acquired by a camera can be transmitted in digital form, e.g., as a serialized digital bit stream, which can be, e.g., as RAW data as acquired by the image sensor or in some processed form, e.g., YUV data produced by an image system processor (ISP) performing de-mosaicking on the RAW image sensor data. Alternatively, the video data acquired by a camera may be formatted into an analog signal prior to transmission, and then transmitted in analog form.

Analog video signal transmission can be advantageous when contrasted to digital transmission. The serialized nature of digital transmission results in digital transmission requiring higher bandwidth than analog transmission. To satisfy the higher bandwidth requirement, more expensive infrastructure is required. Also, while bit accuracy is maintained in digital transmission and may be compromised in analog transmission, the impact of errors that do occur in a digital transmission can be much more impactful than those that occur in analog transmission in terms of the output video quality. Thus, transmitting the original digital video data as an analog signal offers several advantages over digital signal transmission. A system based around analog transmission may offer reduced cost and a more robust transmission. Thus, while the image sensor will generally output digital video data, this may be converted into an analog signal for transmission over an analog video link to a receiver for further processing.

Although well-known in the art, a brief explanation of example formatting of video data is provided below.

In a typical camera, color is produced by filtering the light hitting each photosite (or pixel) to produce either red, green or blue values. The arrangement for the different colors (i.e., color pattern) of the photosites most often used is a so-called "Bayer pattern." RAW data of a single image acquired by a camera (where a video is a sequence of images) like this represents the value of each pixel, for pixels of different colors. In other words, for a single image, RAW data may include pixel values for all red pixels (i.e., pixels configured to filter the incoming light to detect wavelengths in the spectrum associated with red color), pixel values for all green pixels (i.e., pixels configured to filter the incoming light to detect wavelengths in the spectrum associated with green color), and pixel values for all blue pixels (i.e., pixels configured to filter the incoming light to detect wavelengths in the spectrum associated with blue color). Each pixel may be characterized by, inter alia, an intensity or magnitude, and is represented by a number of bits (e.g., 10 bits) used to represent a magnitude of a signal acquired/stored in a particular pixel for a particular component.

RAW data may be processed to form components which are then transmitted in a video signal. For example, red, green, and blue values, or some processed version of those values, are one example of different components of an acquired image, together referred to as "RGB" color space. RAW data may interpolated, a process known as de-mosaicking, and then be transformed to other types of color spaces by an ISP, e.g., in "YUV" color spaces, where Y is a luminance component, carrying the intensity of light information, and U and V are chrominance components, carrying the color information. A video frame may be composed of a matrix of individual pixels of one or more components. In some embodiments, different components may be transmitted by different channels. Unless specified otherwise, descriptions provided herein may refer to pixel values of a certain component or any combination of components.

The pixel values of a video frame (the pixel values or pixels sometimes referred to as "active pixels" to indicate that they contain values representing a video frame as acquired by a camera) may be grouped into horizontal lines, referred to herein as "video lines," and these video lines may be grouped, or stacked, vertically to form a video frame. The screen is built up scanline by scanline, by sending the pixel values, represented by appropriate component values (e.g., RGB or YUV values), over the video link. However, only having a stream of components, e.g., a stream of RGB colors, is not sufficient to know which part of the stream belongs to a particular pixel (e.g., the top-left pixel) on a display. To solve this, two more signals are added to the video signal containing the values of active pixels to be transmitted—one is a signal containing horizontal synchronization ("horizontal sync") pulses and another one is a signal containing vertical synchronization ("horizontal sync") pulses. A horizontal sync pulse provides a reference for different video lines (i.e., it provides an indication of a start-of-line point), while a vertical sync pulse provides a reference for different video frames (i.e., it provides an indication of a start-of-frame point). A horizontal sync pulse (or, simply, "horizontal sync") may be a pulse inserted into a video signal before a stream with pixel values for a given video line begins or/and when a video line is done (but is typically inserted before a video line begins). Thus, the term "video line" refers to active pixel data (i.e., pixel values) for a line of a video frame, which data is included in a video signal in between two consecutive horizontal sync pulses. The two consecutive horizontal sync pulses may then be said as being "associated with" the video line. A vertical sync pulse (or, simply, "vertical sync," also sometimes referred to as a "vertical retrace") may be a pulse or sequence of pulses inserted into a video signal when all video lines of a given video frame have been completed or/and when before video lines of a new video frame begin. Thus, each frame boundary may be demarcated by a single vertical sync pulse or sequence of pulses. Since each line of a frame has the same number of pixels, the time between consecutive horizontal sync pulses is constant. Since each full frame (i.e., a frame with all of its lines) has the same number of pixels, the time between consecutive vertical sync pulses is constant. In this manner, horizontal and vertical sync pulses allow determination of which color component of the video signal belongs to which position to be displayed on the screen. All common analog video transmission schemes mimic this organization of the pixels in a frame and mark the start-of-line and start-of-frame times with a horizontal sync and vertical sync pulses, respectively.

FIG. 1 illustrates a simplified example of an analog (video) signal showing how horizontal sync pulses 100 may be included into the video signal to be transmitted. As shown in FIG. 1, between each two consecutive horizontal sync pulses 100, active pixel data may be included, labeled in FIG. 1 as video lines 102 and 104 (i.e., portions of the video signal which carry the video data for two consecutive lines of a video frame). The pulses 100 are referred to as horizontal sync pulses due to the fact that they indicate the starting point for the active pixel values that would be rendered as a horizontal pixel line. Vertical synchronization lines (not shown in this example) indicate the beginning of a new video frame (within which the plurality of subsequent video lines, i.e., horizontal pixel (data) lines, will share a common vertical start point). Typically, but not necessarily, the horizontal sync pulses occupy the lowest portion of the signal range. A flat portion 106 immediately before a given horizontal sync pulse 100 is referred to as a "front porch" and a horizontal portion 108 immediately after the horizontal sync pulse is referred to as a "back porch", which portions may be set to certain predefined signal levels (e.g., both may be set to a zero voltage level) and may then be used to identify the horizontal sync pulses 100 within a video signal. Together, the front porch 106, the horizontal sync pulse 100, and the back porch 108, are referred to as "horizontal blanking interval" (HBI).

Now turning to how video signals can be transmitted from a transmitter to a receiver, in implementing analog signal transmission over a wired transmission line, a choice can be made between Alternating Current (AC)- and Direct Current (DC)-coupling (the latter also referred to as "conductive coupling").

AC-coupling requires the use of at least one coupling capacitor, which is an additional component compared to DC-coupling where such capacitors are not required. An AC-coupled wired transmission line between a transmitter and receiver typically includes a first coupling capacitor, placed after the transmitter and prior to the transmission channel, and a second coupling capacitor, placed after the transmission channel and prior to the receiver. The term "coupling capacitor" as used herein may refer to one or more coupling capacitors. In contrast, in DC-coupling, only resistors or simply wire(s), and no coupling capacitors, are used and, therefore, DC-coupling may be favored due to its simpler implementation and lower cost and space requirements.

Furthermore, the coupling capacitor(s), together with the termination resistors at either end and with the impedance of the wired transmission cable, may act as a high-pass filter and, thus, may attenuate the transmission of lower frequency components of the analog signal. This is relevant to the transmission of video signals, as the frequency spectrum of such signals often includes DC level and low-frequency elements which would be vulnerable to such high-pass filtering, resulting in loss or distortion of picture information. Thus, it is desirable that a video signal can be preserved down to very low frequency and down to the DC level components. This means that coupling capacitor(s) used for AC-coupling may need to be sufficiently large in order to minimize the cutoff frequency of the high-pass filter formed with the receiver termination, and/or some other ingenious techniques are used.

While AC-coupling may be regarded as an undesirable option due to capacitor size requirements, it can be particularly advantageous in certain applications as it provides improved tolerance against some fault conditions. This is the case, for example, in automotive/vehicle applications, in which reducing the risk of damage during a short-to-battery (STB) fault condition may be a motivation for AC-coupled video links because, as they block DC voltage levels, AC-coupled links are intrinsically resistant to STB faults. Thus, transmitting video signals in an AC-coupled analog signal format can be a cost-effective and robust transmission option, particularly in automotive applications.

In various embodiments, video line inversion techniques as described herein may be used with either AC-coupled or DC-coupled analog transmission.

In some embodiments, video line inversion techniques as described herein may be implemented in systems that implement AC-coupled analog video transmission. In various embodiments, an AC-coupled transmission line for transfer of video data can be implemented according to either a single-ended or a differential-pair transmission scheme. In some implementations, differential-pair video transmission may be particularly advantageous as it may benefit from a stronger immunity to noise compared to single-ended video transmission.

In some embodiments of a single-ended implementation of an AC-coupled transmission line, a respective coupling capacitor may be placed in each of the two sides of a single-ended transmission line, i.e., one coupling capacitor between a transmitter and a conductor cable of the line, and another coupling capacitor between that conductor cable and a receiver. In some embodiments of a differential implementation of an AC-coupled transmission line, a respective pair of coupling capacitors may be placed in each of the two sides of a differential-pair transmission line, i.e., a pair of coupling capacitors between a transmitter and a conductor cable of the line, and another pair of coupling capacitors between that conductor cable and a receiver. In various embodiments, a conductor cable (or simply "cable") may be implemented in any suitable cabling scheme, e.g., as a single conductor (i.e., a conductor wire), as a coaxial cable, or as a dual conductor such as unshielded twisted pair (UTP) or STP (shielded twisted pair), depending on the transmission scheme used (i.e., depending on whether the transmission scheme is single-ended or differential). In some embodiments, the cable of a video transmission channel may include an RCA-type cable or a coaxial cable (which includes a signal wire at least partially enclosed within a shield of conductive material), or an unshielded AVSS, CIVUS or similar signal wire, within a shielded bundle.

Figure 2:
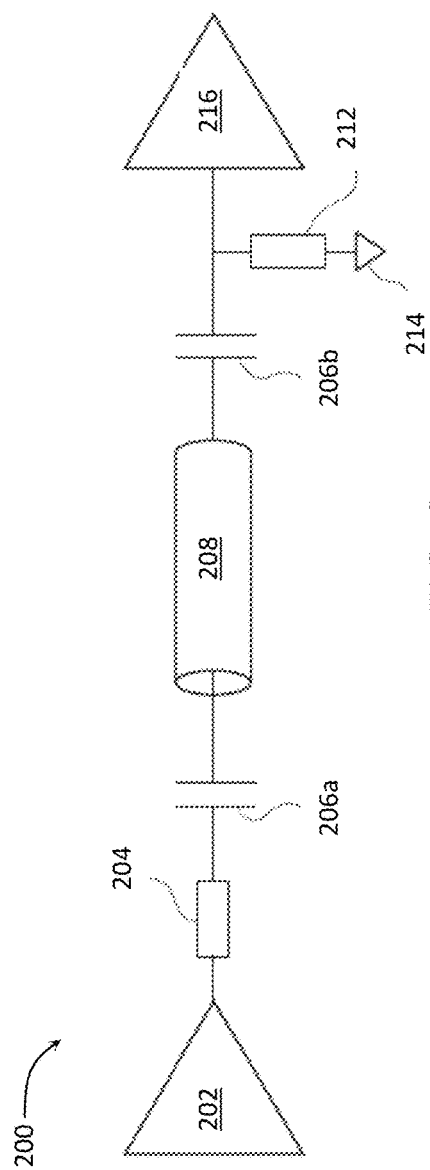
FIG. 2 provides a schematic illustration of an AC-coupled circuit in a single-ended transmission scheme, according to some embodiments of the present disclosure.
Figure 3:
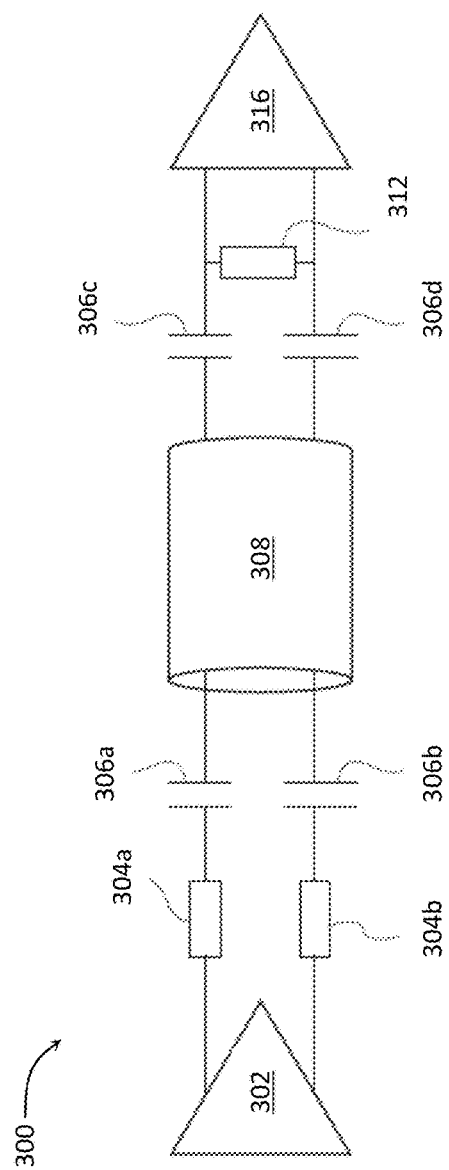
FIG. 3 provides a schematic illustration of an AC-coupled circuit in a differential transmission scheme, according to some embodiments of the present disclosure.

FIGS. 2 and 3 show schematic examples of a single-ended and a differential-pair transmission channels, respectively.

In an AC-coupled transmission scheme 200 shown in FIG. 2, a signal, which may comprise an analog-formatted video signal, is transmitted over a single conductor cable 208, which may be seen as a transmission channel 208. In some embodiments, the conductor cable 208 may include a simple conducting wire. In some embodiments, the conductor cable 208 may include a coaxial cable that includes a core conductive wire and a conductive shield, with the core wire carrying the video signal and the shield being grounded. Since the transmission scheme 200 is a single-ended signaling transmission scheme, only a first wire carries a varying voltage between the transmitter and receiver, while a second wire conductor (not shown in FIG. 2) may be connected to and carry a reference voltage signal (such as that provided by a ground reference 214 shown in FIG. 2). As shown in FIG. 2, the conductor cable 208 connects a transmitter 202 and a receiver 216. In this scheme, one or more coupling capacitors 206a, 206b may be connected between the transmitter 202 and receiver 216. In particular, one or more coupling capacitors 206a may be connected between the transmitter 202 and the conductor cable 208, and one or more coupling capacitors 206b may be connected between the conductor cable 208 and the receiver 216. The transmitter 202 may exhibit a total resistance 204 while the receiver 216 may exhibit a total resistance 212, which are in serial connection with the transmitter 202.

Alternatively, in an AC-coupled transmission scheme 300 shown in FIG. 3, a signal, which may comprise an analog-formatted video signal, is transmitted over a differential-pair conductor cable 308, which may be seen as a transmission channel 308. In some embodiments, the conductor cable 308 may include a UTP or an STP cable. While single-ended implementation can be advantageous due to its simpler implementation and lower cost, differential-pair signaling transmission schemes may advantageously offer resistance to external EMI and reduce the amount of electromagnetic emissions produced by the link. This is because the properties of the two separate signals/lines of the differential-pair of lines can be selected so as to provide cancellation of common mode interfering signals. As shown in FIG. 3, a transmitter 302, which may exhibit resistances 304a and 304b (serially connected to the transmitter 302) in the two lines of the differential-pair scheme, is connected to the conductor cable 308 via a pair of coupling capacitors 306a, 306b. Similarly, a receiver 316 is coupled to the conductor cable 308 via a resistance 312 (in parallel connection with the receiver 316) and a pair of coupling capacitors 306c, 306d.

Undesirable Effects of Periodic Interference Signals

Sometimes, noise signals may undesirably interfere with an analog video signal being transmitted from a transmitter to a receiver. The analog video signal is then said to be affected by such noise signals. In some deployment scenarios, the interference may be in a form of one or more periodic noise signals, e.g., a periodic EMI noise signal, which may be added to the video signal being transmitted. A schematic illustration of such a scenario is shown in FIG. 4.

Figure 4:
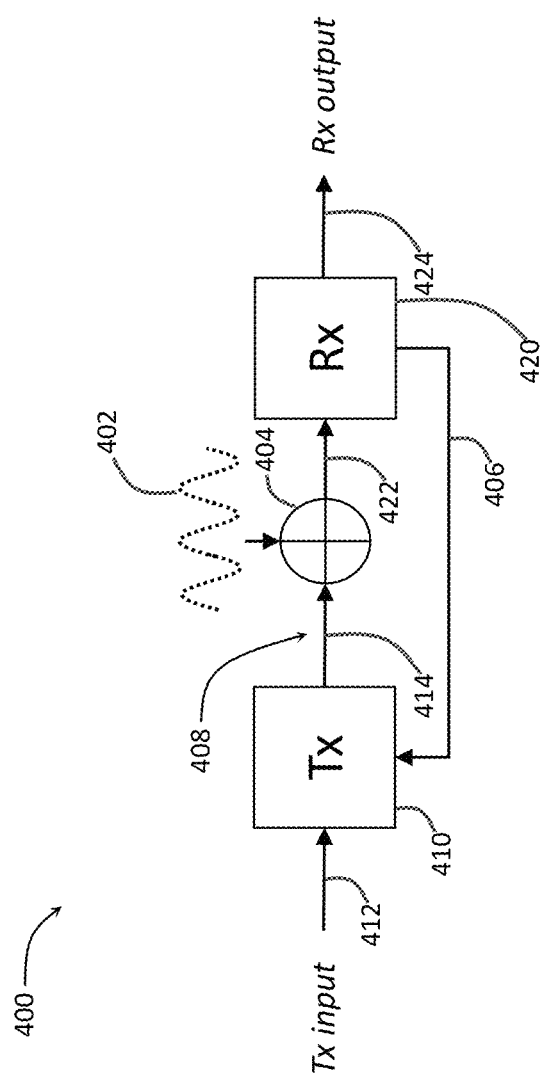
FIG. 4 provides a schematic illustration of a periodic interference noise signal affecting analog transmission of a video signal.

FIG. 4 illustrates a video system 400 that includes a transmitter 410 and a receiver 420. The transmitter 420 is configured to transmit a video signal to the receiver 420, over a cable 408. In some embodiments, the transmitter 410, the receiver 420, and the cable 408 may be implemented as, respectively, the transmitter 202, the receiver 216, and the cable 208 of FIG. 2. In other embodiments, the transmitter 410, the receiver 420, and the cable 408 may be implemented as, respectively, the transmitter 302, the receiver 316, and the cable 208 of FIG. 3. In some embodiments, the transmitter 410, the receiver 420, and the cable 408 may be implemented as, respectively, the transmitter 910, the receiver 920, and the cable 930 of FIG. 9.

As shown in FIG. 4, the transmitter 410 may receive an input video signal, which may be referred to as a "Tx (transmit) input" 412, and, based on the Tx input 412, generate an output video signal, which may be referred to as a "Tx output" 414. The Tx output 414 is then being transmitted from the transmitter 410 to the receiver 420 over the cable 408. During the transmission, a periodic noise signal (or a plurality of periodic noise signals) may interfere with, and thereby affect, the Tx output 414. Such a noise signal is illustrated in FIG. 4 with a sinusoidal noise signal 402, although, in various embodiments of the present disclosure, the noise signal 402 may include any periodic signal that may interfere with the Tx output 414 as described herein. As is schematically illustrated in FIG. 4 with an adder 404, the noise signal 402 may effectively be added to, or superimposed on, the Tx output 414. As a result, an input video signal to the receiver 420, which may be referred to as a "Rx (receive) input" 422, includes a combination (e.g., a sum) of the Tx output 414 and the noise signal 402. The receiver 420 may be configured to process the Rx input 422 and, based on the Rx input 422, generate an output video signal, which may be referred to as a "Rx output" 424. The Rx output 424 may then be rendered on a display.

Inventors of the present disclosure realized that, when the noise signal 402 is a periodic signal, addition of such a signal to the Tx output 414 results in certain phase difference of the noise signal from one video line to the next video line in the Rx input 422. Inventors further realized that, some ranges of such a phase difference may result in the noise signal being out of phase from one video line to another video line, in which case the noise signal 402 may be spatially integrated by the human eye and not visible when the Rx output 424 is rendered on a display. On the other hand, some other ranges of a phase difference from one video line to the next may result in the noise signal being in phase, or highly correlated, from one video line to another, in which case the noise signal 402 may be clearly visible and degrade picture quality when the Rx output 424 is rendered on a display.

Consider, e.g., that the video signal to be transmitted contains active video data where each frame has 720 lines, each line has 1280 pixels, and the video line frequency is 45 kilohertz (KHz). Further consider that the video system 400 is exposed to a sinusoidal wave noise signal (tone) 402. Now, two different examples of different frequencies of the noise signal 402 are analyzed.

In a first example, the frequency of the noise signal 402 is 18 megahertz (MHz). In this case, the noise signal 402 has an integer number of cycles per video line because 18 MHz/45 kHz=400. This may be considered to be a "perfect" correlation, where the phase of the noise signal 402 will be identical from line to line. The noise signal 402 will superimpose on the video signal and appear as a static pattern of peaks and valleys on the image, which will be visible to the eye and disturb the image quality.

In a second example, the frequency of the noise signal 402 is 18.0225 MHz. In this case, the noise signal 402 will have 400.5 cycles per video line (18.0225 MHz/45 kHz=400.5), and the noise signal 402 will be 180 degrees out of phase on alternating lines (i.e., the phase difference of the noise signal 402 will be 180 degrees from one line to the next). When displayed on screen, because of such small separation between rows of pixels on high-definition displays, the grid like appearance of the out of phase tone will be invisible to the human eye.

As the foregoing description illustrates, the phase difference of a noise signal from one line to another is dependent on the frequency of the noise signal (for a given video line frequency). Inventors of the present disclosure realized that four cases, or areas of interest, in the phase difference of the noise signal from line to line may be identified. Case 1: the phase difference in the noise signal from one video line to the next is between 0 and 90 degrees, in which case the noise is highly correlated from line to line, is clearly visible, and degrades picture quality. Case 2: the phase difference in the noise signal from one video line to the next is between 90 and 180 degrees, in which case the noise is out of phase from line to line, and spatially integrated by the human eye (not visible). Case 3: the phase difference in the noise signal from one video line to the next is between 180 and 270 degrees, in which case the noise is out of phase from line to line, and spatially integrated by the human eye (not visible). Case 4: the phase difference in the noise signal from one video line to the next is between 270 and 360 degrees, in which case the noise is highly correlated from line to line, is clearly visible, and degrades picture quality.

To address this issue, inventors came up with a technique that may be referred to as "video line inversion," which technique may reduce or eliminate the detrimental effects of periodic noise signals that may affect transmission of an analog video signal from a transmitter to a receiver.

Video Line Inversion

Video line inversion is based on recognition that, if it was possible to make sure that the phase difference of the noise signal from line to line (i.e., on adjacent video lines) is between 90 and 270 degrees (cases 2 and 3, described above), then the noise signal would be out of phase from line to line and not visible to the human eye. Video line inversion then aims to maximize the occurrence that, no matter, what the frequency of a noise signal is, a phase difference of the noise signal is between 90 to 270 degrees between the noise signal on adjacent video lines.

Illustrating one embodiment of video line inversion with reference to the video system 400 of FIG. 4, the first step may be for the receiver 420 to identify the presence of a noise signal, and to determine a line to line phase difference of the noise signal. If the phase difference is between 0 and 90 degrees or between 270 and 360 degrees (i.e., cases 1 and 4, described above), the receiver 420 may provide an indication 406 to the transmitter 410 that video line inversion is required. The transmitter 410 may then start inverting the video on alternate lines. The receiver 410 may then detect this inversion and cancel the effect on the video data by performing a second inversion. However, because the noise signal 402 has been added to the video signal during transmission, the first inversion (i.e., inversion by the transmitter 410) does not apply to it. In this case, the second inversion in the receiver 420 will invert the phase of the noise signal 402, which will result in moving the phase difference of the noise signal 402 on adjacent video lines from being between 0 and 90 degrees or between 270 and 360 degrees to being in the 90 to 270 degrees region. In this manner, the phase difference of the noise signal 402 between adjacent lines may be kept in the optimal region where it will not be visible to the eye. Thus, when the receiver 420 determines that the phase difference of the noise signal 402 between adjacent video lines is according to cases 1 and 4, described above, line inversion is enabled, while, when the receiver 420 determines that the phase difference of the noise signal 402 between adjacent video lines is according to cases 2 and 3, described above, line inversion is disabled. Different scenarios of phase differences in a noise signal from one video line to another, and a result of implementing video line inversion as described herein may be explained with reference to illustrations of FIGS. 5-7.

Figure 5:
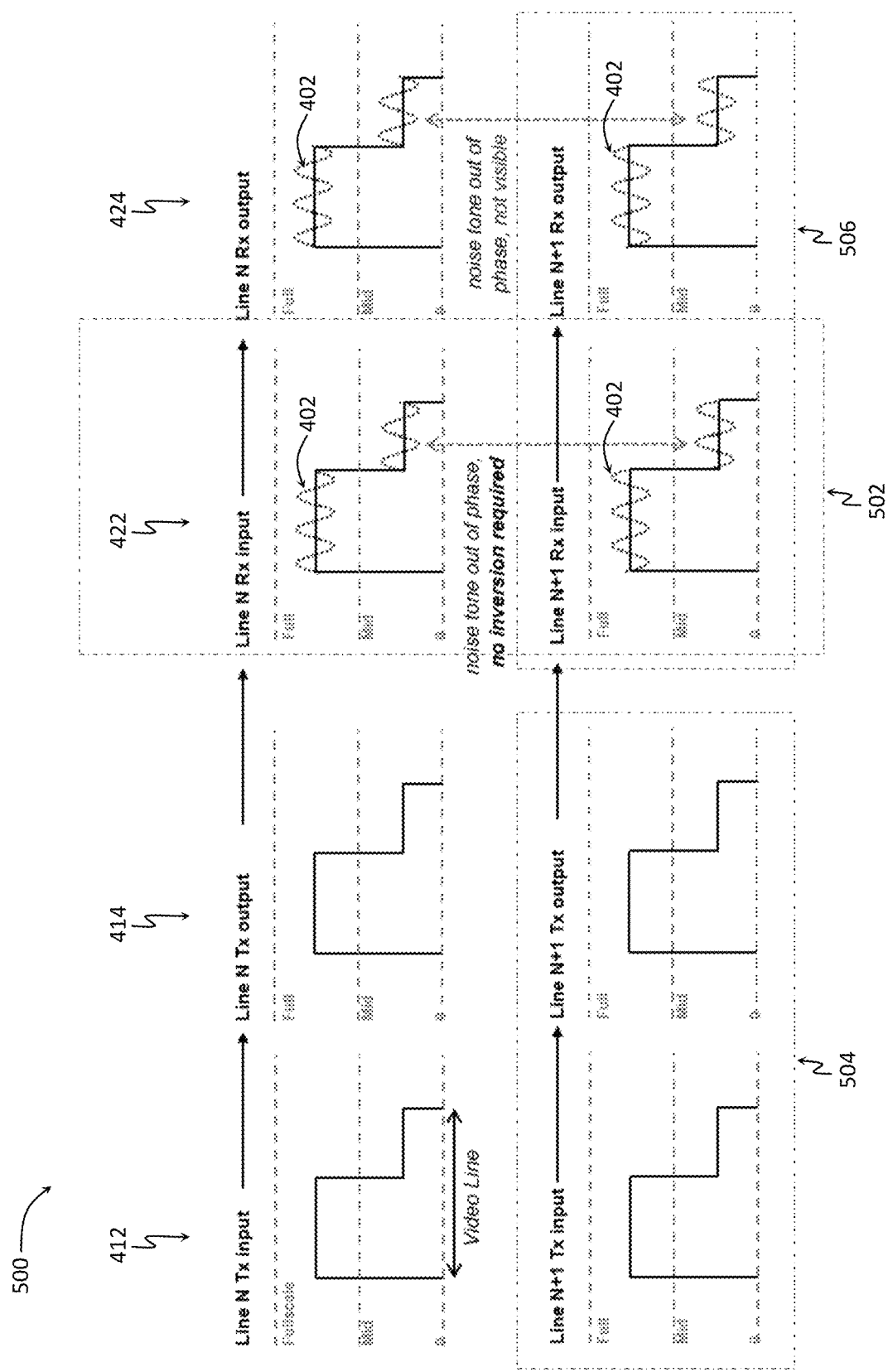
FIG. 5 is a schematic illustration of a noise signal being out of phase with video lines, according to some embodiments of the present disclosure.

FIG. 5 is a schematic illustration 500 of a noise signal being out of phase with video lines, according to some embodiments of the present disclosure. In particular, the illustration 500 shows two adjacent video lines, labeled in FIG. 5 as "Line N" and "Line N+1," where N is an integer indicating a particular video line (N) and the next video line (N+1). For each video line, the illustration 500 shows the Tx input 412, the Tx output 414, the Rx input 422, and the Rx output 424, as described above. The illustration 500 further shows the noise signal 402, shown as a dashed sinusoidal line superimposed on the Rx input 422 and the Rx output 424 for each of the lines N and N+1. Comparison of the noise signal 402 between the Rx input 422 for the line N and the Rx input 422 for the line N+1 (i.e., the video lines shown in FIG. 5 within a dashed-dotted box 502), reveals that the noise signal 402 in the Rx input 422 in the line N+1 is 180 degrees out of phase with the noise signal 402 in the Rx input 422 in the line N. This is within the 90 to 270 degrees region (i.e., cases 2 and 3, described above), which means that the phase difference of the noise signal 402 between adjacent lines is already in the optimal region where it will not be visible to the eye and no inversion is required. Thus, line inversion is disabled both in the transmitter 410 and in the receiver 420. The line inversion being disabled in the transmitter 410 may be observed from the illustration 500 by comparing the Tx input 412 and the Tx output 414 for the line N+1 (i.e., the video lines shown in FIG. 5 within a dashed-dotted box 504), illustrating that the video data of the line N+1 is not inverted by the transmitter 410. The line inversion being disabled in the receiver 420 may be observed from the illustration 500 by comparing the Rx input 422 and the Rx output 424 for the line N+1 (i.e., the video lines shown in FIG. 5 within a dashed-dotted box 506), illustrating that the video data of the line N+1 is not inverted by the receiver 420.

Figure 6:
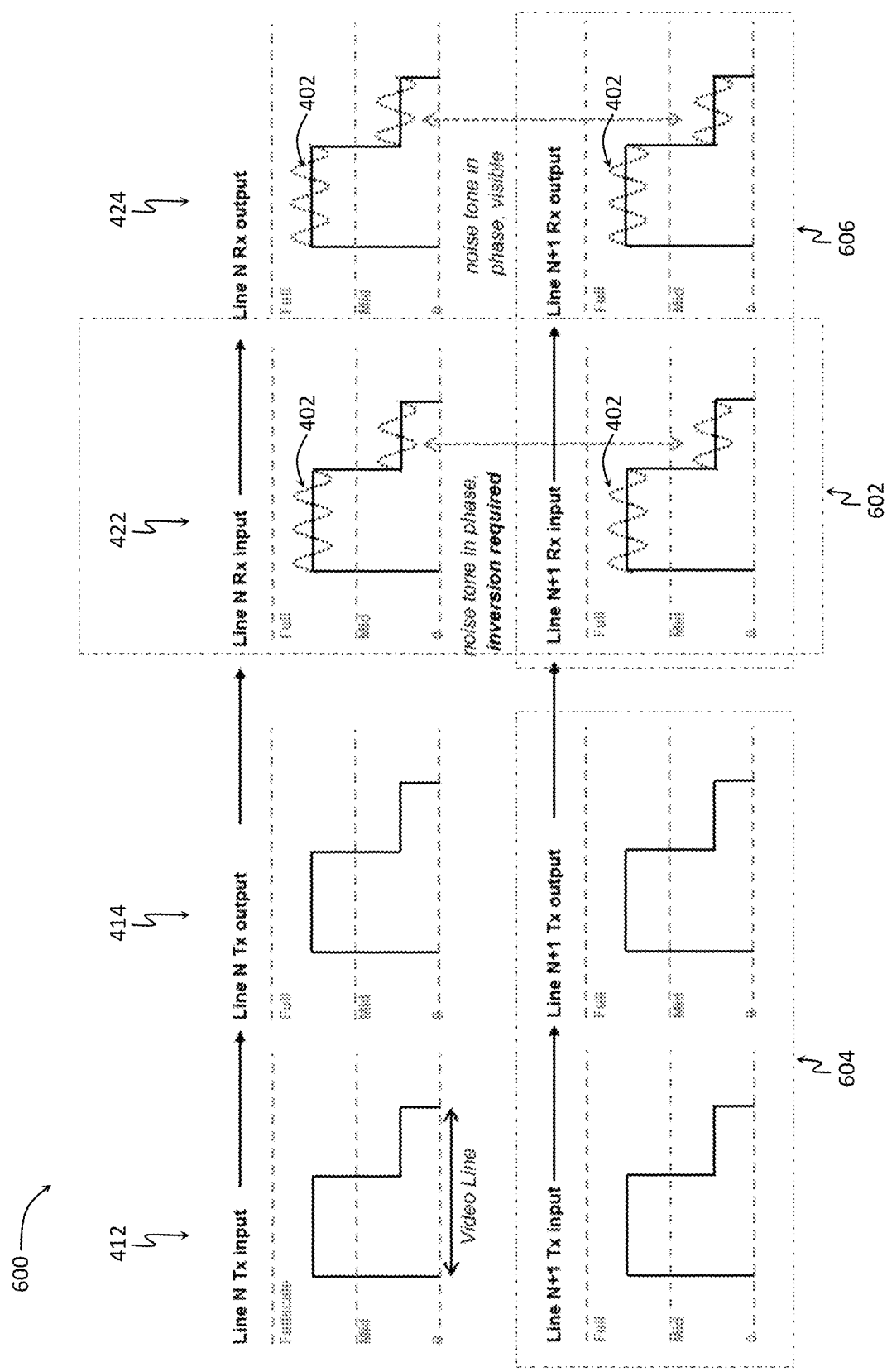
FIG. 6 is a schematic illustration of a noise signal being in phase with video lines, according to some embodiments of the present disclosure.

FIG. 6 is a schematic illustration 600 of a noise signal being in phase with video lines, according to some embodiments of the present disclosure. Similar to FIG. 5, the illustration 600 shows the Tx input 412, the Tx output 414, the Rx input 422, and the Rx output 424 for two adjacent video lines, N and N+1, as well as another example of the noise signal 402. Comparison of the noise signal 402 between the Rx input 422 for the line N and the Rx input 422 for the line N+1 (i.e., the video lines shown in FIG. 6 within a dashed-dotted box 602), reveals that the noise signal 402 in the Rx input 422 in the line N+1 is in phase (i.e., 0 degrees phase difference) with the noise signal 402 in the Rx input 422 in the line N. This is within the 0 to 90 degrees region (i.e., case 1, described above), which means that the noise is highly correlated from line to line, is clearly visible, and degrades picture quality. Thus, line inversion would be helpful for the scenario illustrated in FIG. 6, but is not yet enabled. The line inversion being disabled in the transmitter 410 may be observed from the illustration 600 by comparing the Tx input 412 and the Tx output 414 for the line N+1 (i.e., the video lines shown in FIG. 6 within a dashed-dotted box 604), illustrating that the video data of the line N+1 is not inverted by the transmitter 410. The line inversion being disabled in the receiver 420 may be observed from the illustration 600 by comparing the Rx input 422 and the Rx output 424 for the line N+1 (i.e., the video lines shown in FIG. 6 within a dashed-dotted box 606), illustrating that the video data of the line N+1 is not inverted by the receiver 420. In this case, when rendered on a display, the Rx output 424 will exhibit visual degradation due to the presence of the noise signal 402.

Figure 7:
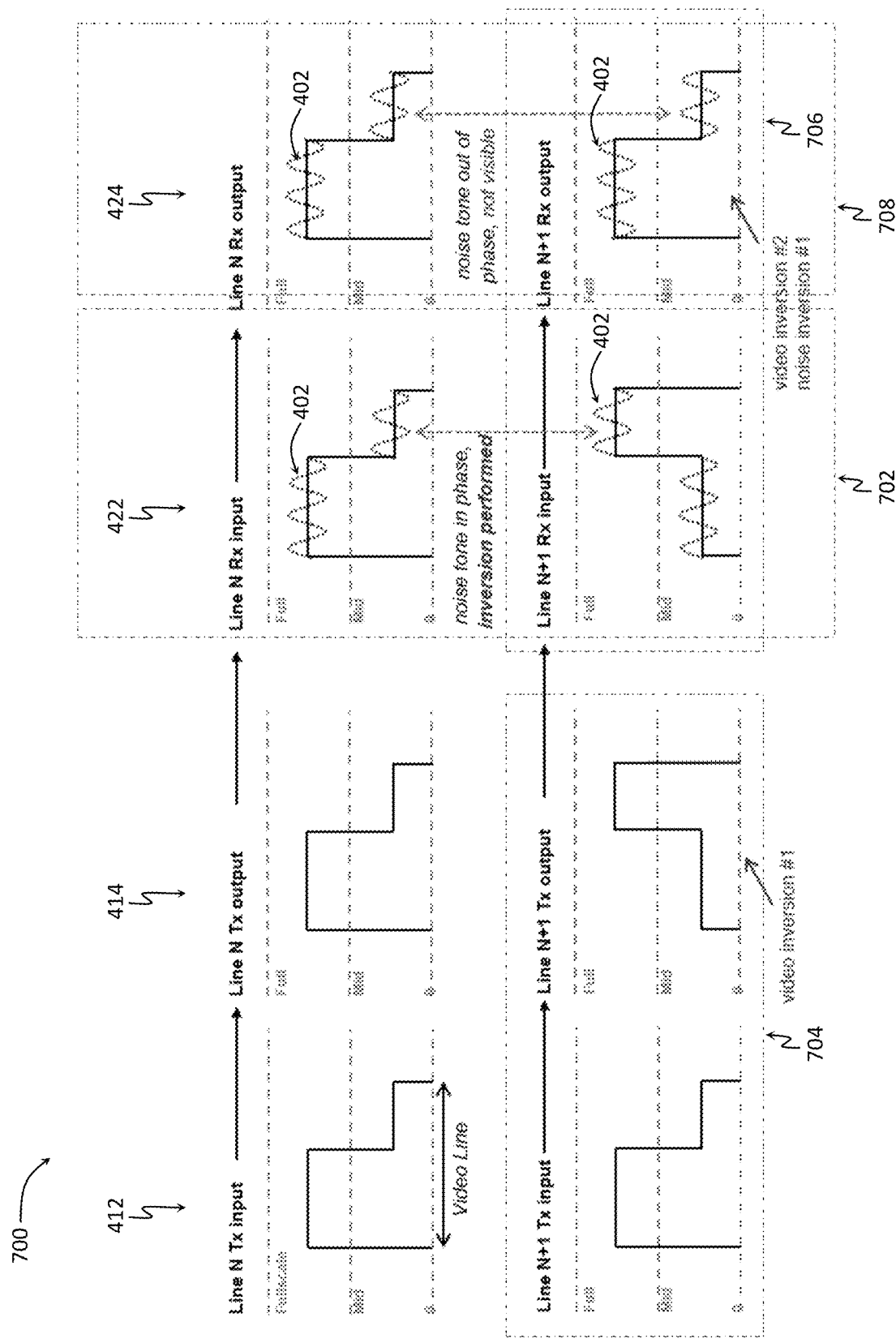
FIG. 7 is a schematic illustration of a noise signal being in phase with video lines and video inversion being implemented by a transmitter and a receiver, according to some embodiments of the present disclosure.

FIG. 7 is a schematic illustration 700 of a noise signal being in phase with video lines and video inversion being implemented by a transmitter and a receiver, according to some embodiments of the present disclosure. Similar to FIG. 6, the illustration 700 shows the Tx input 412, the Tx output 414, the Rx input 422, and the Rx output 424 for two adjacent video lines, N and N+1. FIG. 7 illustrates the same example of the noise signal 402 as that illustrated in FIG. 6. Namely, comparison of the noise signal 402 between the Rx input 422 for the line N and the Rx input 422 for the line N+1 (i.e., the video lines shown in FIG. 7 within a dashed-dotted box 702), reveals that the noise signal 402 in the Rx input 422 in the line N+1 is in phase (i.e., 0 degrees phase difference) with the noise signal 402 in the Rx input 422 in the line N. Again, this is within the 0 to 90 degrees region (i.e., case 1, described above), which means that the noise is highly correlated from line to line, is clearly visible, and degrades picture quality. In contrast to FIG. 6, FIG. 7 illustrates signals when line inversion is enabled. The line inversion being enabled in the transmitter 410 may be observed from the illustration 700 by comparing the Tx input 412 and the Tx output 414 for the line N+1 (i.e., the video lines shown in FIG. 7 within a dashed-dotted box 704), illustrating that the video data of the line N+1 is inverted by the transmitter 410 (i.e., the Tx output 414 for the line N+1 is inverted with respect to the Tx input 412 for the line N+1). The line inversion being enabled in the receiver 420 may be observed from the illustration 700 by comparing the Rx input 422 and the Rx output 424 for the line N+1 (i.e., the video lines shown in FIG. 7 within a dashed-dotted box 706), illustrating that the video data of the line N+1 is inverted by the receiver 420 (i.e., the Rx output 424 for the line N+1 is inverted with respect to the Rx input 422 for the line N+1). Inversion at the receiver 420 effectively adds 180 degrees to the line-to-line phase difference in the noise signal 402 in the Rx output 424 (i.e., the video lines shown in FIG. 7 within a dashed-dotted box 708), compared to the line-to-line phase difference in the noise signal 402 in the Rx input 424 (i.e., the video lines shown in FIG. 7 within the dashed-dotted box 702). This means, that the phase difference of the noise signal 402 between adjacent lines in the Rx output 424 is 180 degrees, instead of 0 degrees as it is for the RX input 422, which places it in the optimal region of between 90 to 270 degrees (i.e., cases 2 and 3, described above), so that the noise signal 402 in the RX output 424 will not be visible to the eye when the Rx output 424 is rendered on a display.

To summarize the concepts highlighted by the illustrations of FIGS. 5-7, when video line inversion is implemented in the video system 400, the receiver 420 may be configured to determine the phase difference for the noise signal 402 from one video line to another of the Rx input 422. When the phase difference is determined to be such that it will result in the noise signal 402 degrading picture quality, the receiver 420 may be configured to provide an indication 406 to the transmitter 410 to perform video line inversion for a certain subset of video lines of a video signal to be transmitted. The transmitter 410 may then be configured to perform the video line inversion on some subset of video lines of the Tx input 412 to generate the Tx output 414, and the receiver may be configured to perform the video line inversion on the corresponding subset of video lines of the Rx input 422 to generate the Rx output 424. The inversion on the side of the receiver 420 effectively cancels the inversion performed on the side of the transmitter 410, so that video content of the Rx output 424 corresponds to that of the Tx input 412. However, because the inversion on the side of the receiver 420 also inverts the periodic noise signal 402 added to the Tx output 414 during the transmission from the transmitter 410 to the receiver 420, it affects the phase difference of the noise signal 402 from one video line to another, effectively adding a 180 degrees phase shift to the noise signal 402. In other words, the inversion on the side of the receiver 420 inverts the periodic noise signal 402 of the Rx input 422 to generate the Rx output 424 with an inverted version of the noise signal 402. Such an inversion of the noise signal 402 allows shifting the line-to-line phase difference of the noise signal 402 from a range where it may visibly degrade picture quality to a range where it may be spatially integrated by and not visible to the human eye. For example, if, before the inversion, the line-to-line phase difference of the noise signal 402 (i.e., the line-to-line phase difference of the noise signal 402 in the Rx input 422) is between 0 and 90 degrees or between 270 and 360 degrees (i.e., cases 1 and 4, described above), then the inversion performed by the receiver 420 results in the line-to-line phase difference of the noise signal 402 (i.e., the line-to-line phase difference of the noise signal 402 in the Rx output 424) being shifted to being between 90 and 270 degrees (cases 2 and 3, described above). Thus, before the inversion, the line-to-line phase difference of the noise signal 402 in the Rx input 422 may be such that it may result in the noise signal 402 degrading picture quality if the Rx input 422 is to be rendered on a display. However, the inversion performed by the receiver 420 to generate the Rx output 424 based on the Rx input 422 results in the line-to-line phase difference of the noise signal 402 in the Rx output 424 being shifted to a range where the noise signal is out of phase from one video line to another video line, in which case the noise signal 402 in the Rx output 424 may be spatially integrated by the human eye and not visible when the Rx output 424 is rendered on a display.

Figure 8:
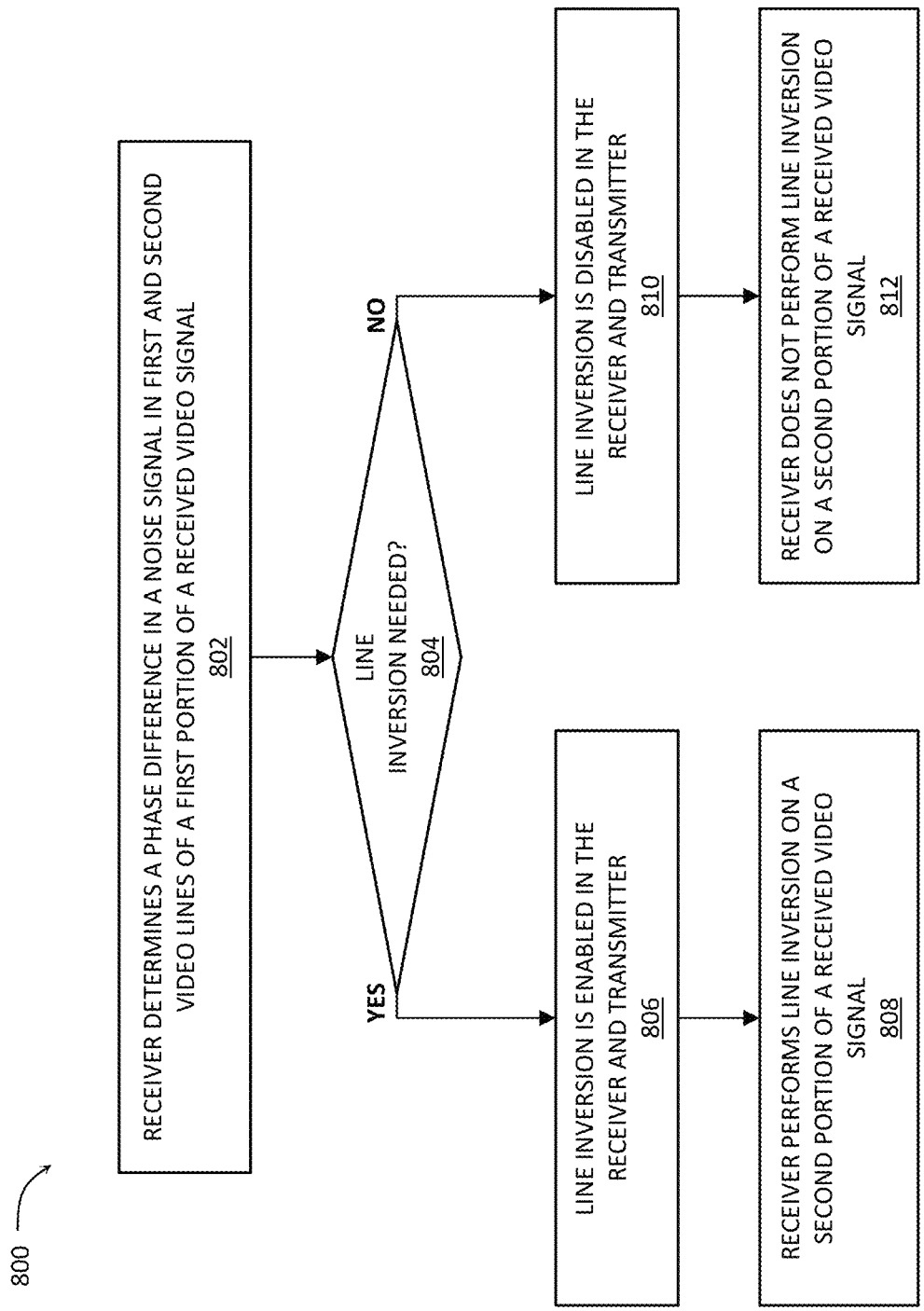
FIG. 8 is a flowchart of a method of operating a system configured to implement video line inversion for a video signal transmitted over an analog video link, according to some embodiments of the present disclosure.

FIG. 8 presents a flowchart of an example method 800 of operating a system, e.g., a video system, configured to implement video line inversion for a video signal transmitted over an analog video link, according to some embodiments of the present disclosure. The method 800 can be implemented using any video system in which a video signal is acquired by a camera or generated in any other manner on the transmitting side and is transmitted in analog format, by a transmitter, to a receiver, over a wired link, to be processed, and possibly displayed on a display, on the receiving side (i.e., by the receiver). The method 800 will be illustrated with reference to the video system 400 shown in FIG. 4. However, in general, the method 800, in whole or in part, can be implemented using any other suitable video system comprising a transmitter and a receiver configured to implement video line inversion as described herein, for example, a video system 900 shown in FIG. 9, and/or a data processing system 1000 shown in FIG. 10, described below.

The method 800 may begin with block 802 where the receiver 420 receives a first portion of a video signal transmitted by the transmitter 410 (i.e., the receiver 420 receives a first portion of the Tx output 414 as the Rx input 422) and determines a phase difference in a noise signal in first and second video lines of the first portion of the received video signal (i.e., in the first portion of the Rx input 422). In general, the receiver 420 configured to determine the phase difference in block 802 may include any data processing system configured to process data from the signals received by the receiver 420. In some embodiments, the first and second video lines for which the receiver 420 determines the phase difference in block 802 may be consecutive video lines of the Rx input 422, e.g., consecutive video lines of a single frame of the Rx input 422. In other embodiments, the first and second video lines for which the receiver 420 determines the phase difference in block 802 may be non-consecutive video lines of the Rx input 422, and may be either video lines of a single video frame, or video lines of two different video frames of the video signal. Although illustrations of FIGS. 5-7, described above, refer to evaluation of phase differences between consecutive video lines, analysis of any two video lines, including non-consecutive lines, of the Rx input 422 could be reduced/translated to the phase difference between the two consecutive video lines as described above, based on the relation between the frequency of the noise signal 402 and the video line frequency. Therefore, determination of the phase difference for any two video lines of a received video signal in block 802 may allow determination of whether the noise signal 402 is such that it will result in visible degradation of picture quality (i.e., cases 1 and 4, described above) or the noise signal 402 is such that it will not result in visible degradation of picture quality (i.e., cases 2 and 3, described above).

The method 800 may then proceed with block 804 where the receiver 420, including any data processing system configured to process data from the signals received by the receiver 420, may determine, based on the phase difference determined in block 802, whether line inversion is needed. In general, when the phase difference determined in the block 802 is within a certain predefined range (which may be one of a plurality of such ranges), line inversion in a form of modifying a second portion of the video signal by inverting a subset of a plurality of video lines of the second portion of the video signal may be needed and this is what the receiver 420 may evaluate in block 804. For example, as described above, line inversion may be needed if the phase difference between two consecutive lines is between 0 and 90 degrees or between 270 and 360 degrees (i.e., cases 1 and 4, described above). On the other hand, line inversion may not be needed if the phase difference between two consecutive lines is between 90 and 270 degrees (i.e., cases 2 and 3, described above). This principle may be extended to the phase difference determined for any first and second lines of the first portion of the video signal, even if they are not consecutive lines, to establish one or more phase difference ranges in which line inversion is needed because otherwise the phase noise of the Rx output 424 will be visible to the eye and degrade picture quality, and to establish one or more phase difference ranges in which line inversion is not needed because without it the phase noise of the Rx output 424 will not be visible to the eye.

If, in block 804, the receiver 420 determines that line inversion is needed, then the method 800 may proceed with block 806, where line inversion functionality is enabled in both the receiver 420 and the transmitter 410. To that end, in some embodiments, the receiver 420 may provide the indication 406 to the transmitter 410 to enable the line inversion functionality, or, in other embodiments, one or both of the receiver 420 and the transmitter 410 may be manually configured to enable the line inversion functionality based on the decision of the block 804. For the time being when the line inversion functionality is enabled, the transmitter 410 is configured to perform line inversion for active pixel data for a certain subset of video lines of the video signal (Tx input 412) to be transmitted, thus generating the Tx output 414 with some video lines inverted in comparison with the Tx input 412, e.g., as illustrated with the example in the box 704 of FIG. 7. Similarly, for the time being when the line inversion functionality is enabled, the receiver 420 is configured to perform line inversion for active pixel data for the same subset of video lines of the video signal received by the receiver 420 (Rx input 422), thus generating the Rx output 424 with some video lines inverted in comparison with the Rx input 422, as is shown in FIG. 8 with block 808, e.g., as illustrated with the example in the box 706 of FIG. 7.

If, in block 804, the receiver 420 determines that line inversion is not needed, then the method 800 may proceed with block 810, where line inversion functionality is disabled in both the receiver 420 and the transmitter 410. To that end, in some embodiments, the receiver 420 may provide the indication 406 to the transmitter 410 to disable the line inversion functionality, or, in other embodiments, one or both of the receiver 420 and the transmitter 410 may be manually configured to disable the line inversion functionality based on the decision of the block 804. For the time being when the line inversion functionality is disabled, the transmitter 410 is configured to not perform line inversion for active pixel data for any video lines of the video signal Tx input 412, thus generating the Tx output 414 in which none of the video lines are inverted in comparison with the Tx input 412, e.g., as illustrated with the example in the box 504 of FIG. 5. Similarly, for the time being when the line inversion functionality is disabled, the receiver 420 is configured to not perform line inversion for active pixel data for any video lines of the video signal received by the receiver 420 (Rx input 422), thus generating the Rx output 424 in which none of the video lines are inverted in comparison with the Rx input 422, as is shown in FIG. 8 with block 812, e.g., as illustrated with the example in the box 506 of FIG. 5.

In some embodiments, the method 800 may be performed multiple times during transmission of a video signal from the transmitter 410 to the receiver 420, which may advantageously allow the video system 400 to adapt to possibly changing nature of the noise signal 402. As described above, the first and second portions of the video signal referred to in the method 800 merely refer to, respectively, a portion of a video signal based on which phase difference is determined and a decision to enable or disable the line inversion is made, and a portion of a video signal for which the line inversion is enabled and disabled in the transmitter and the receiver.

For example, in some embodiments, the receiver 420 may be configured to determine the phase difference as described with reference to block 802 and to make the decision regarding enabling or disabling the line inversion as described with reference to block 804 by evaluating the noise signal 402 in a portion of an HBI for a first video line and evaluating the noise signal 402 in a portion of an HBI for a second video line. Thus, in such embodiments, the phase difference is determined in block 802 as a phase difference between the noise signal 402 in an HBI ("first HBI") of a first video line of the Rx input 422 and the noise signal 402 in an HBI ("second HBI") of a second video line of the Rx input 422. In some such embodiments, the first HBI and the second HBI may be the HBIs associated with two consecutive video lines of a single video frame of the first portion of the video signal. In other embodiments, the first HBI and the second HBI may be the HBIs associated with two non-consecutive video lines of a single video frame of the first portion of the video signal. In still other embodiments, the first HBI and the second HBI may be the HBIs associated with video lines of two different frames. In any of these embodiments, the first and second HBIs may, but do not have to be associated with the first and second video lines for which the phase difference is determined. Thus, the noise signal may be compared for first and second HBIs associated with some two video lines of the first portion of the video signal, but the result of the comparison may be used to infer what the phase difference is between some other two video lines of the first portion of the video signal. In some embodiments of such an example, the portion of the first HBI for which the noise signal is evaluated may be one of a front porch, a back porch, or a horizontal sync pulse of the first HBI. Similarly, the portion of the second HBI for which the noise signal is evaluated may be one of a front porch, a back porch, or a horizontal sync pulse of the second HBI.

In another example, in some embodiments, the phase difference may be determined in block 802 by comparing the noise signal in a first line of a vertical blanking interval (VBI) of the first portion of the video signal and the noise signal in a second line of the VBI (i.e., of the same VBI). In some embodiments, the first and second lines of the VBI in which the noise signal is being compared may be two consecutive lines of the VBI. In other embodiments, the first and second lines of the VBI in which the noise signal is being compared may be two non-consecutive lines of the VBI. Again, in any of these embodiments, the first and second lines of the VBI may, but do not have to be associated with the first and second video lines for which the phase difference is determined. Thus, the noise signal may be compared for first and second lines of an VBI associated with a certain two frames of the first portion of the video signal, but the result of the comparison may be used to infer what the phase difference is between two video lines in any one or more frames of the first portion of the video signal.

In yet another example, in some embodiments, the phase difference may be determined in block 802 by comparing the noise signal in a portion of a first VBI of the video signal and the noise signal in a portion of a second VBI of the video signal (i.e., in different VBIs).

Thus, as examples above illustrate, in some embodiments, determination of phase difference in a noise signal in first and second video lines in block 802 may be made by determining phase difference in other parts of the video signal, not the active pixel data of the first and second video lines themselves, e.g. in HBIs associated with the first and second video lines, or in one or more VBIs. This may be advantageous because such parts of the video signal may be somewhat predictable (e.g., the front porch, the back porch, and the horizontal sync of an HBI are each supposed to be at a certain predefined level or have a certain predefined signal shape), whereas the active pixel data of video lines themselves may not be and, therefore, identifying a periodic noise signal in the video lines themselves may be significantly more challenging or even impossible. Once a phase difference is determined from any such parts of a video signal, a phase difference between first and second video lines may be inferred. In other embodiments, block 802 may include determining the phase difference by evaluating the noise signal in the first and second video lines themselves, e.g., if the transmitter 410 is configured to send certain test video lines to the receiver 420, i.e., video lines with certain known active pixel content, which would enable the receiver 420 to isolate the noise signal 402 and determine the phase difference in the Rx input 422 from the first to the second video line.

Block 804 of the method 800 may include the receiver 420 determining that the line inversion is needed when the phase difference determined in block 802 is such that it corresponds to a phase difference between two consecutive video lines of the received video signal Rx input 422 being either between 0 and 90 degrees or between 270 and 360 degrees (e.g., the phase difference between two consecutive video lines of the received video signal Rx input 422 being between about −90 degrees and +90 degrees). When line inversion is determined to be needed, the subset of the plurality of video lines inverted by the transmitter 410 and the receiver 420 may include every other video line (e.g., every second video line, i.e., all odd video lines or all even video lines) of the plurality of video lines of the video signal.

It should also be noted that the determination of the phase difference in block 802 may also be performed with the transmitter 410 and the receiver 420 already performing the line inversion (i.e., what is referred to as the "second portion" of the video signal in description of the method 800 may serve also as the "first portion" in subsequent performance of block 802). In such a case, the receiver 420 can adapt the phase difference ranges for determining whether to keep or disable the line inversion in block 804 accordingly. In some embodiments, the transmitter 410 may be configured to provide an indication to the receiver 420 as to whether the line inversion is enabled or disabled in the transmitter 410 for generating the Tx output 414 transmitted to the receiver 420. For example, in some embodiments, the transmitter 410 may be configured to flag/identify current frame's configuration in a corresponding test line transmitted to the receiver 420 as a part of the video signal. In another example, such a test line may be applicable to several frames of the video signal. The receiver 420 may then be configured to extract transmitter configuration from said indication (e.g., from the test line) and to enable or disable the line inversion in accordance with the indication provided by the transmitter 410, i.e., to enable line inversion when the transmitter 410 performs line inversion, and to disable line inversion when the transmitter 410 does not perform line inversion. For example, in some embodiments, a test line may be inserted by the transmitter 410 during the non-active region in the transmitter 410 (i.e., when active pixel data is not being transmitted) and may, e.g., be a full scale amplitude to indicate to the receiver 420 that line inversion is enabled, and be a 0 amplitude to indicate to the receiver 420 that line inversion is disabled, or vice versa.

In some embodiments, the measurement of block 802 and/or the decision 804 is performed several times, over several different portions of the received video signal, and then the final decision to enable or disable line inversion is made. Such embodiments may result in improved accuracy of the decision.

Although not specifically shown in FIG. 8, the method 800 may further include reproducing the received signal Rx output 424, once the appropriate line inversion has been performed. This may, e.g., include displaying the received video on a display.

Example Video System

Figure 9:
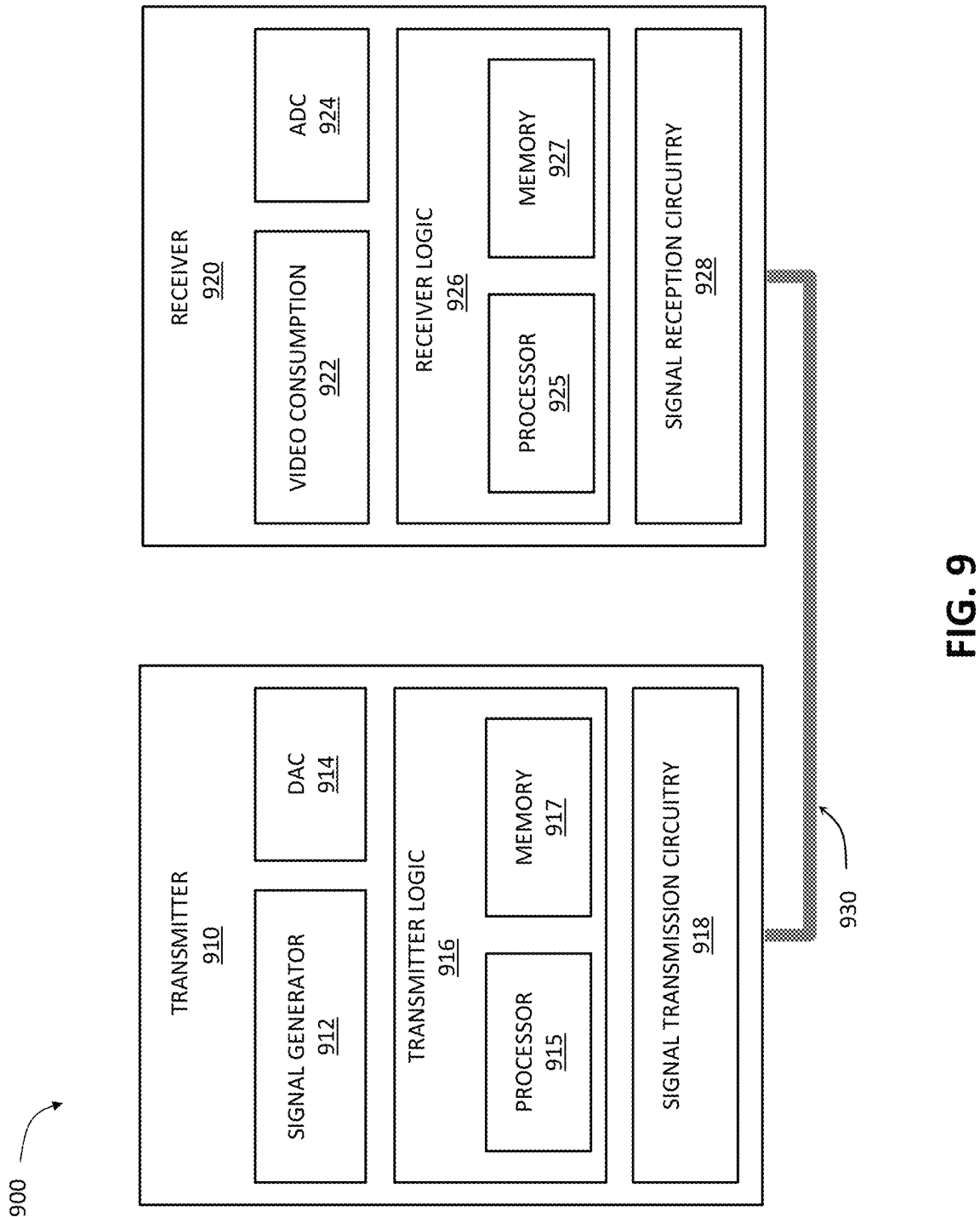
FIG. 9 provides a block diagram illustrating an example video system, according to some embodiments of the present disclosure.

FIG. 9 illustrates an example video system 900, according to some embodiments of the present disclosure. As shown in FIG. 9, the example system 900 may include a transmitter 910 and a receiver 920 coupled by an analog link 930. The analog link 930 may be any suitable wired conductor cable, e.g., the single-ended conductor cable 208 or the differential-pair cable 308, described above with reference to AC-coupled links. In other examples, the analog link 930 may be an analog DC-coupled link. The transmitter 910 may be the transmitter 410 and/or the receiver 920 may be the receiver 420, described above.

As shown in FIG. 9, the transmitter 910 may include, or be communicatively coupled to, a video signal generator 912. The video signal generator 912 may include any suitable means for generating a signal to be transmitted to the receiver 920 over the analog link 930. For example, in some embodiments, the video signal generator 912 may include any suitable image sensor, image system processor or camera (which may include a plurality of cameras) configured to acquire a video signal (which may include a plurality of video signals). In other embodiments, the signal generator 912 may include means for producing a computer-generated video signal.

As further shown in FIG. 9, the transmitter 910 may also include, or be communicatively coupled to, one or more digital-to-analog converters (DACs) 914. As used herein, the term "DAC" refers to an electronic circuit/device that converts a digital value that represents an amplitude of a continuous physical quantity to a corresponding analog value. In some embodiments, the one or more DACs 914 may be configured to receive a digital video signal comprising digital pixel values, and convert the digital values (i.e., discrete-time and discrete-amplitude values of the digital signal) to a continuous-time and continuous-amplitude analog signal. In some embodiments, the one or more DACs 914 may be configured to convert a digital signal generated by the signal generator 912, e.g., a digital video signal comprising digital pixel values as acquired by a camera (e.g., when line inversion is disabled). In other embodiments, the one or more DACs 914 may be configured to convert a processed version of the digital signal generated by the signal generator 912, e.g., as processed by the transmitter logic 916 to include certain subset of video lines to be inverted, as described herein (e.g., when line inversion is enabled). Thus, the one or more DACs 914 convert digitally processed signals to analog domain for analog transmission to the receiver 920 over the analog link 930.

In some embodiments, besides the one or more DACs 914, the transmitter 910 may include one or more analog-to-digital converters (ADCs) (not specifically shown in FIG. 9). As used herein, the term "ADC" refers to an electronic circuit/device that converts a continuous physical quantity carried by an analog signal to a digital number that represents the quantity's amplitude (or to a digital signal carrying that digital number). The result is a sequence of digital values (i.e., a digital signal) that has converted a continuous-time and continuous-amplitude analog input signal to a discrete-time and discrete-amplitude digital signal. Various converters included in the transmitter 910 may operate by being provided with clock signals generated by a clock generator (not specifically shown in FIG. 9), e.g., under the control of the processor 915.

As also shown in FIG. 9, the transmitter 910 may further include, or be communicatively coupled to, transmitter logic 916. The transmitter logic 916 may be implemented in hardware, software, firmware, or any suitable combination of the one or more of these, and may be configured to control the operation of the transmitter 910 as described herein. To that end, the transmitter logic 916 may make use of at least one processor 915 and at least one memory element 917 along with any other suitable hardware and/or software to enable its intended functionality of using phase difference measurements on the noise signal for implementing line inversion of certain video lines of a video signal to be transmitted over the analog link 930, as described herein. In some embodiments, the processor 915 can execute software or an algorithm to perform the activities as discussed in the present disclosure, e.g., the processor 915 can execute the algorithms that control digital-to-analog conversion of signals generated by the signal generator 912 for transmission over the analog transmission link 930. Furthermore, the processor 915 can execute algorithms that control generation and transmission of the Tx output 414 to the receiver 920 as described herein. To that end, the processor 915 may be configured to receive pixel values of the signal generated by the signal generator 912, e.g., in the digital form as generated by the signal generator 912 and prior to the conversion to analog by the DAC 914, and perform inversion of a plurality of pixel values for some video lines when line inversion as described herein is enabled. Thus, in some embodiments, the processor 915 may perform line inversion of a plurality of pixel values for selected video lines in digital domain, before the digital signal with inverted video lines is converted to analog domain for transmission to the receiver 920. The processor 915 may also be configured to control transmission of the analog signal Tx output 414, to the receiver 920, as described herein. Further descriptions of the processor 915 and the memory element 917 are provided below.

Also shown in FIG. 9 is that the transmitter 910 may also include, or be communicatively coupled to, signal transmission circuitry 918 for transmitting signals to the receiver 920. In particular, the signal transmission circuitry 918 may include components for enabling analog transmission of the analog video signal, e.g., as obtained from the DAC 914 and processed by the transmitter logic 916. In some embodiments, such components may include coupling capacitors, e.g., coupling capacitors on the transmitter side as described with reference to FIGS. 2 and 3, as well as any other circuitry as known in the art to be used for analog transmission of signals. In addition, the signal transmission circuitry 918 may further include components for enabling transmission of an indication, from the transmitter 910 to the receiver 920, that the transmitter 910 is enabled to perform line inversion as described herein. In various embodiments, such an indication may be transmitted either as a part of (i.e., included in) the video signal to be transmitted in analog format over the link 930, or over a separate communication channel between the transmitter 910 and the receiver 920, which separate communication channel may be either wired or wireless.

Turning to the receiving side of the video system 900, as shown in FIG. 9, the receiver 920 may include, or be communicatively coupled to, signal reception circuitry 928, receiver logic 926, an ADC 924, and, optionally, a video consumption device 922. The video consumption device 922, may, in some embodiments, be a video processing device such as an image system processor, a video analysis device, such as an ADAS processor, or a video rendering device such as a display.

The signal reception circuitry 928 may be configured to receive signals from the transmitter 910. In particular, the signal reception circuitry 928 may include components for enabling receipt of AC- or DC-coupled transmission of the analog video signal, e.g., to be provided to the ADC 924 for conversion to digital and to be provided to the receiver logic 926 for further processing, possibly after conversion by the ADC 924. In some embodiments, components for enabling receipt of AC- or DC-coupled transmission of the analog video signal may include coupling capacitors, e.g., coupling capacitors on the receiver side as described with reference to FIGS. 2 and 3, as well as any other circuitry as known in the art to be used for reception of analog signals. In addition, the signal reception circuitry 928 may further include components for enabling receipt of other information from the transmitter 910. Again, as described herein, in various embodiments, such other information, e.g., indication as to whether the transmitter 910 is enabled to implement line inversion, may be transmitted either as a part of (i.e., included in) the video signal to be transmitted in analog format over the analog link 930, or over a separate communication channel between the transmitter 910 and the receiver 920, which separate communication channel may be either wired or wireless.

As shown in FIG. 9, the receiver 920 may also include one or more ADCs 924. In case of the ADC 924 used in the video system 900, the analog input signal being converted may be the video signal transmitted from the transmitter 910 over the analog video link 930 and received by the signal reception circuitry 928, e.g., to be further processed in digital form by the receiver logic 926. In some embodiments, the receiver 920 may further include one or more DACs (not specifically shown in FIG. 9). Various converters included in the receiver 920 may operate by being provided with clock signals generated by a clock generator (not specifically shown in FIG. 9), e.g., under the control of the processor 925.

Similar to the transmitter logic 916, the receiver logic 926 may be implemented in hardware, software, firmware, or any suitable combination of the one or more of these, and may be configured to control the operation of the receiver 920, as described herein. To that end, the receiver logic 926 may make use of at least one processor 925 and at least one memory element 927 along with any other suitable hardware and/or software to enable its intended functionality of determining the phase difference between the noise signal in first and second video lines and using the determined phase difference to determine whether to enable or disable line inversion as described herein. In some embodiments, the processor 925 can execute software or an algorithm to perform the activities as discussed in the present disclosure, e.g., the processor 925 can execute the algorithms that control analog-to-digital conversion of signals received by the signal reception circuitry 928 after having been transmitted over the analog transmission link 930, possibly after having been converted to digital domain by the ADC 924. Furthermore, the processor 925 can execute algorithms that control determining the phase difference between the noise signal in first and second video lines and using the determined phase difference to determine whether to enable or disable line inversion as described herein. The processor 925 may also be configured to provide an indication to the transmitter 910 as to whether the line inversion is to be enabled or disabled, as described herein. Still further, when line inversion as described herein is enabled, the processor 925 may be configured to receive pixel values of the signal received from the transmitter 910, e.g., in the digital form as converted by the one or more ADCs 924, and perform inversion of a plurality of pixel values for some video lines. Thus, in some embodiments, the processor 925 may perform line inversion of a plurality of pixel values for selected video lines in digital domain, after the analog signal with inverted video lines has been received from the transmitter 910 and converted to digital domain. Further descriptions of the processor 925 and the memory element 927 are provided below.

Each of the processors 915, 925 may be configured to communicatively couple to other system elements via one or more interconnects or buses. Such a processor may include any combination of hardware, software, or firmware providing programmable logic, including by way of non-limiting example a microprocessor, a digital signal processor (DSP), a field-programmable gate array (FPGA), a programmable logic array (PLA), an application specific IC (ASIC), or a virtual machine processor. The processor 915 may be communicatively coupled to the memory element 917, while the processor 925 may be communicatively coupled to the memory element 927, for example in a direct-memory access (DMA) configuration. Each of the memory elements 917, 927 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory items discussed herein should be construed as being encompassed within the broad term "memory element."

The information being tracked or sent to the one or more components/elements of the transmitter 910 and of the receiver 920 could be provided and/or stored in any database, register, control list, cache, or storage structure, all of which can be referenced at any suitable timeframe. Any such storage options may be included within the broad term "memory element" as used herein and may be used to implement the memory element 917 and/or memory element 927. Similarly, any of the potential processing elements, modules, and machines described herein should be construed as being encompassed within the broad term "processor" as used herein and may be used to implement the processor 915 and/or the processor 925. Each of the elements shown in FIG. 9, e.g., the signal generator 912, the DAC 914, the transmitter logic 916, the video consumption 922, the ADC 924, or the receiver logic 926, can also include suitable interfaces for receiving, transmitting, and/or otherwise communicating data or information in a network environment, either over wired or a wireless communications link.

In certain example implementations, mechanisms for using video line inversion to reduce the impact of periodic interference on analog transmission of video signals as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g., the memory elements 917 and 927 shown in FIG. 9, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g., the processors 915 and 925 shown in FIG. 9, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory, an electrically erasable programmable read-only memory) or an ASIC that includes digital logic, software, code, electronic instructions, or any suitable combination thereof.

Example Data Processing System

Figure 10:
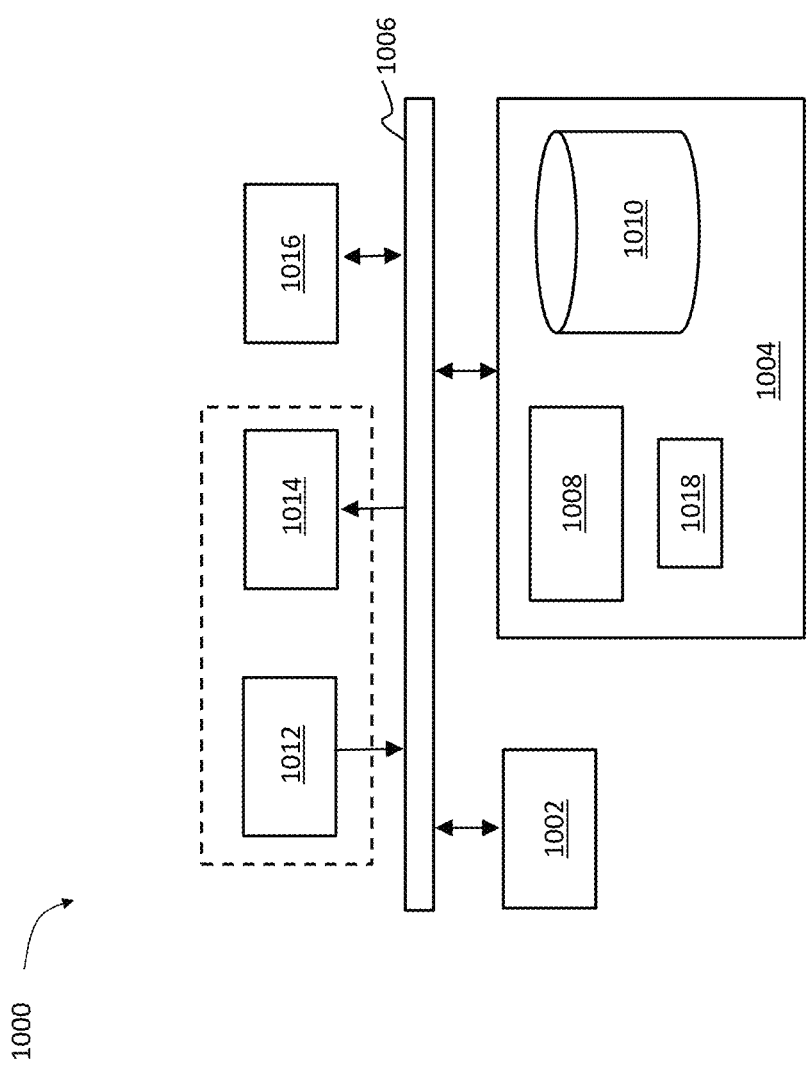
FIG. 10 provides a block diagram illustrating an example data processing system, according to some embodiments of the present disclosure.

FIG. 10 provides a block diagram illustrating an example data processing system for using video line inversion to reduce the impact of periodic interference signals on analog transmission of video signals as disclosed herein, according to some embodiments of the present disclosure. Such a data processing system could be configured to, e.g., function as the transmitter logic 916 and/or as the receiver logic 926 described herein or as any other system configured to implement various improved mechanisms related to video line inversion as disclosed herein.

As shown in FIG. 10, the data processing system 1000 may include at least one processor 1002 coupled to memory elements 1004 through a system bus 1006. As such, the data processing system may store program code within memory elements 1004. Further, the processor 1002 may execute the program code accessed from the memory elements 1004 via a system bus 1006. In one aspect, the data processing system may be implemented as a computer that is suitable for storing and/or executing program code. It should be appreciated, however, that the data processing system 1000 may be implemented in the form of any system including a processor and a memory that is capable of performing the functions described within the present disclosure.

In some embodiments, the processor 1002 may be the processor 915 and the memory elements 1004 may be the memory elements 917 of the transmitter 910 of the video system 900 shown in FIG. 9, as described above. In some embodiments, the processor 1002 may be the processor 925 and the memory elements 1004 may be the memory elements 927 of the receiver 920 of the video system 900 shown in FIG. 9, as described above.

The memory elements 1004 may include one or more physical memory devices such as, for example, local memory 1008 and one or more bulk storage devices 1010. The local memory may refer to RAM or other non-persistent memory device(s) generally used during actual execution of the program code. A bulk storage device may be implemented as a hard drive or other persistent data storage device. The processing system 1000 may also include one or more cache memories (not shown) that provide temporary storage of at least some program code in order to reduce the number of times program code must be retrieved from the bulk storage device 1010 during execution.

Input/output (I/O) devices depicted as an input device 1012 and an output device 1014, optionally, can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 10 with a dashed line surrounding the input device 1012 and the output device 1014). An example of such a combined device is a touch sensitive display, also sometimes referred to as a "touch screen display" or simply "touch screen". In such an embodiment, input to the device may be provided by a movement of a physical object, such as e.g., a stylus or a finger of a user, on or near the touch screen display.

When used in a video system according to various embodiments of the present disclosure, e.g. in the video system 900 shown in FIG. 9, the input device 1012 may be used to receive input, e.g., as provided by a user, and to configure the video system 900 in accordance with the user input. For example, the input received by the input device 1012 may configure the transmitter 910 and/or the receiver 920 to enable or disable video line inversion, e.g., based on the phase difference determination performed in block 802 of the method 800.

A network adapter 1016 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 1000, and a data transmitter for transmitting data from the data processing system 1000 to said systems, devices and/or networks. Modems, cable modems, and Ethernet cards are examples of different types of network adapter that may be used with the data processing system 1000.

When used in a video system according to various embodiments of the present disclosure, e.g. in the video system 900 shown in FIG. 9, the network adapter 1016 may be used to receive input from other systems, computer systems, remote network devices, and/or remote storage devices through intervening private or public networks, and to configure the video system 900 in accordance with the received input. For example, the network adapter 1016 may be configured to receive examples of input as described with reference to the input received by the input device 1012 from the user, except that now it would be received from other systems, computer systems, remote network devices, and/or remote storage devices through intervening private or public networks. The transmitter 910 and the receiver 920 of the video system 900 may then be configured in accordance with the input received by the network adapter 1016, e.g., configured to enable or disable video line inversion as described herein.

As pictured in FIG. 10, the memory elements 1004 may store an application 1018. In various embodiments, the application 1018 may be stored in the local memory 1008, the one or more bulk storage devices 1010, or apart from the local memory and the bulk storage devices. It should be appreciated that the data processing system 1000 may further execute an operating system (not shown in FIG. 10) that can facilitate execution of the application 1018. The application 1018, being implemented in the form of executable program code, can be executed by the data processing system 1000, e.g., by the processor 1002. Responsive to executing the application, the data processing system 1000 may be configured to perform one or more operations or method steps described herein.

SELECT EXAMPLES

Example 1 provides a video system for communicating, in analog format, video signals over a video link (e.g., implemented as a wired connection). The system includes a receiver that is configured to receive a first portion of a video signal transmitted by a transmitter over the video link; determine a phase difference between a noise signal in a first video line of the first portion of the video signal and the noise signal in a second video line of the first portion of the video signal; and, when the phase difference is determined to be within a predefined range, modify a second portion of the video signal received by the receiver by inverting a subset of a plurality of video lines of the second portion of the video signal.

Example 2 provides the video system according to example 1, where the first video line and the second video line are consecutive lines associated with a single frame of the first portion of the video signal.

Example 3 provides the video system according to example 1, where the first video line and the second video line are non-consecutive lines associated with a single frame of the first portion of the video signal.

Example 4 provides the video system according to example 1, where the first video line and the second video line are video lines associated with different frames of the first portion of the video signal.

Example 5 provides the video system according to any one of examples 1-4, where the phase difference is determined by comparing the noise signal in a portion of a first HBI of the first portion of the video signal and the noise signal in a portion of a second HBI of the first portion of the video signal.

Example 6 provides the video system according to example 5, where the portion of the first HBI is one of a front porch, a back porch, or a horizontal sync pulse of the first HBI, and the portion of the second HBI is one of a front porch, a back porch, or a horizontal sync pulse of the second HBI.

Example 7 provides the video system according to any one of examples 1-4, where the phase difference is determined by comparing the noise signal in a first line of a VBI and the noise signal in a second line of the VBI (i.e., of the same VBI).

Example 8 provides the video system according to any one of examples 1-4, where the phase difference is determined by comparing the noise signal in a portion of a first VBI of the first portion of the video signal and the noise signal in a portion of a second VBI of the first portion of the video signal.

Example 9 provides the video system according to any one of the preceding examples, where the phase difference is within the predefined range when an absolute value of the phase difference is less than about 90 degrees (i.e., when the phase difference is between about −90 degrees and +90 degrees, or, said differently, when the phase difference is either between 0 and 90 degrees or between 270 and 360 degrees).

Example 10 provides the video system according to any one of the preceding examples, where the subset of the plurality of video lines of the second portion of the video signal includes every other video line (e.g., every second video line, i.e., all odd video lines or all even video lines) of the plurality of video lines of the second portion of the video signal.

Example 11 provides the video system according to any one of the preceding examples, where, when the phase difference is determined to be within the predefined range, the transmitter is configured to enable a video line inversion where the transmitter inverts the subset of the plurality of video lines of the second portion of the video signal.

Example 12 provides the video system according to example 11, where the receiver is further configured to, when the phase difference is determined to be within the predefined range, provide an indication to the transmitter to enable the video line inversion, and the transmitter is configured to enable the video line inversion in response to receiving the indication from the receiver.

Example 13 provides the video system according to example 11, where the transmitter is configured to enable the video line inversion by being manually configured.

Example 14 provides the video system according to any one of examples 11-13, where the receiver is further configured to receive an indication indicating whether the video line inversion is enabled in (i.e., applied by) the transmitter. In some embodiments, said indication may be provided by the transmitter. In other embodiments, said indication may be received from some other entity, e.g., user input, in case the receiver is manually configured to perform video line inversion because the transmitter has the video line inversion enabled.

Example 15 provides the video system according to any one of the preceding examples, where the video link is an AC-coupled video link.

Example 16 provides a video system for communicating, in analog format, video signals over a wired connection (i.e., over a wired video link). The system includes a transmitter that is configured to generate a transmit output video signal (Tx output) based on a transmit input video signal (Tx input) by inverting a subset of a plurality of video lines of the Tx input; provide an indication to a receiver that the subset of the plurality of video lines are inverted; and transmit the Tx output to the receiver in analog format over the wired connection.

Example 17 provides the video system according to example 16, further including the receiver, the receiver configured to receive a receive input video signal (Rx input), the Rx input being indicative of (e.g., being based on, or including) the Tx output; receive the indication that the subset of the plurality of video lines in the Tx output are inverted; and generate a receive output video signal (Rx output) based on the Rx input by invert the subset of the plurality of video lines of the Rx input.

Example 18 provides the video system according to example 17, where the receiver is further configured to, prior to transmitter generating the Tx output by inverting the subset of the plurality of video lines of the Tx input, determine that a noise signal added to the Tx output during transmission from the transmitter to the receiver would result in visible degradation and provide an indication to the transmitter to generate the Tx output by inverting the sub subset of the plurality of video lines of the Tx input.

Example 19 provides a video system for communicating, in analog format, video signals over a video link (e.g., implemented as a wired connection). The system includes a receiver and a transmitter. The transmitter is configured to transmit a video signal (Tx output), in analog format, over a wired connection, to the receiver. The receiver is configured to receive the video signal transmitted by the transmitter (Rx input). When the video signal received by the receiver (Rx input) includes a periodic noise signal (in addition to the video signal data transmitted by the transmitter) and the periodic noise signal is such that a line-to-line phase difference of the periodic noise signal in the video signal received by the receiver (Rx input) is within a predefined range, each of the transmitter and the receiver is configured to enable line inversion. When the line inversion is enabled in the transmitter, the transmitter is configured to invert a subset of a plurality of video lines of the video signal prior to transmitting the video signal to the receiver. When the line inversion is enabled in the receiver, the receiver is configured to invert the subset of the plurality of video lines of the video signal received by the receiver, e.g., prior to displaying the received video signal on a display. Thus, when a line-to-line phase difference of the periodic noise signal in the video signal received by the receiver is within a predefined range, each of the transmitter and the receiver is configured to enable line inversion for a subset of a plurality of video lines of the video signal.

Example 20 provides the video system according to example 19, where the predefined range is between −90 degrees and +90 degrees (i.e., when an absolute value of the line-to-line phase difference is less than about 90 degrees, or, said differently, when the line-to-line phase difference is either between 0 and 90 degrees or between 270 and 360 degrees).

Example 21 provides the video system according to examples 19 or 20, where the subset of the plurality of video lines of the video signal includes every second line (e.g., all odd video lines or all even video lines) of active pixel values of at least a portion of the video signal.

Example 22 provides the video system according to any one of examples 19-21, where the receiver is configured to determine the line-to-line phase difference of the periodic noise signal in the video signal received by the receiver, and further configured to provide an indication to the transmitter when the line-to-line phase difference of the periodic noise signal in the video signal received by the receiver is determined to be within the predefined range.

Example 23 provides the video system according to any one of examples 19-22, where the transmitter is configured to provide to the receiver an indication that a line inversion in the transmitter is enabled when the transmitter inverts the subset of the plurality of video lines of the video signal prior to transmitting the video signal to the receiver.

Example 24 provides a method of operating a video system for communicating, in analog format, video signals over a video link. The method includes a transmitter of a video system transmitting a first portion of a video signal to a receiver of the video system; and further includes the receiver determining a phase difference between a noise signal in a first video line of the first portion of the video signal received from the transmitter and the noise signal in a second video line of the first portion of the video signal received from the transmitter. When the phase difference is determined to be within the predefined range, the method includes the receiver providing an indication to the transmitter to modify, prior to transmission to the receiver, a second portion of the video signal by inverting a subset of a plurality of video lines of the second portion of the video signal. When the phase difference is determined to be within the predefined range, the method further includes the transmitter transmitting the second portion of the video signal to the receiver, where the subset of the plurality of video lines of the second portion of the video signal are inverted; and the receiver inverting the subset of the plurality of video lines of the second portion of the video signal received from the transmitter to generate a modified second portion of the video signal. Optionally, the method also includes the receiver displaying the modified second portion of the video signal on a display.

Example 25 provides the method according to example 24, further including the transmitter transmitting an indication to the receiver that the transmitter modified the second portion of the video signal by inverting the subset of the plurality of video lines of the second portion of the video signal.

Example 26 provides the method according to examples 24-25, configured to operate with or in the video system according to any one of the preceding examples.

Example 27 provides a method of operating the video system according to any one of the preceding examples.

Any one of the system, the transmitter, the receiver, and the method of any one of the preceding examples may be implemented in a vehicle or in a surveillance system. Furthermore, any one of the system, the transmitter, the receiver, and the method of any one of the preceding examples may include, or be communicatively coupled/connected to a camera configured to acquire the video signal to be transmitted over an analog transmission link, e.g., over an AC-coupled link, where the camera may include a plurality of optical sensors (e.g. photodiodes) configured to generate pixel values of the video signal to be transmitted over the link.

Other Implementation Notes, Variations, and Applications

Principles and advantages discussed herein can be used in any device or system where video or image data is transmitted over an analog transmission link and where one or more periodic noise signals may interfere with the transmission. It is to be understood that not necessarily all objects or advantages mentioned herein may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGS. may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), FPGAs, and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be distributed or consolidated in any suitable manner. Along similar design alternatives, any of the illustrated components, modules, and elements of the FIGS. may be combined in various possible configurations, all of which are clearly within the broad scope of the present disclosure. In certain cases, it may be easier to describe one or more of the functionalities of a given set of flows by only referencing a limited number of electrical elements. It should be appreciated that the electrical circuits of the figures and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in the present disclosure references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to video line inversion to reduce the impact of periodic interference signals on analog transmission of video signals, e.g. those summarized in the one or more processes shown in FIG. 8, illustrate only some of the possible functions that may be executed by, or within, the systems illustrated in the FIGS, e.g. the systems shown in FIG. 4, 9, or 10. Some of these operations may be deleted or removed where appropriate, or these operations may be modified or changed considerably without departing from the scope of the present disclosure. In addition, the timing of these operations may be altered considerably. The preceding operational flows, e.g. as shown in FIG. 8, have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of any of the apparatus, device, or system described above may also be implemented with respect to the method or processes of using or operating said apparatus device, or system, and specifics in the examples provided for any of the apparatus, device, or system described herein may be used anywhere in corresponding methods or processes, and vice versa.

The invention claimed is:

1. A video system, comprising:
   a signal reception circuit, configured to receive a first portion and a second portion of a video signal transmitted by a transmitter over a video link; and
   a receiver logic, configured to:
      determine a phase difference between a noise signal in a first video line of the first portion of the video signal and the noise signal in a second video line of the first portion of the video signal,
      when the phase difference is determined to be within a predefined range, provide an indication to the transmitter to generate the second portion of the video signal by inverting a subset of a plurality of video lines of a transmit input video signal (Tx input), and
      modify the second portion of the video signal received by the signal reception circuit by inverting the subset of the plurality of video lines of the Tx input that was inverted by the transmitter to generate the second portion of the video signal.

2. The video system according to claim 1, wherein the first video line and the second video line are consecutive lines associated with a single frame of the first portion of the video signal.

3. The video system according to claim 1, wherein the first video line and the second video line are non-consecutive lines associated with a single frame of the first portion of the video signal.

4. The video system according to claim 1, wherein the first video line and the second video line are video lines associated with different frames of the first portion of the video signal.

5. The video system according to claim 1, wherein the phase difference is determined by comparing the noise signal in a portion of a first horizontal blanking interval (HBI) of the first portion of the video signal and the noise signal in a portion of a second HBI of the first portion of the video signal.

6. The video system according to claim 5, wherein:
   the portion of the first HBI is one of a front porch, a back porch, or a horizontal sync pulse of the first HBI, and
   the portion of the second HBI is one of a front porch, a back porch, or a horizontal sync pulse of the second HBI.

7. The video system according to claim 1, wherein the phase difference is within the predefined range when an absolute value of the phase difference is less than 90 degrees.

8. The video system according to claim 1, wherein the subset of the plurality of video lines of the second portion of the video signal includes every other video line of the plurality of video lines of the second portion of the video signal.

9. The video system according to claim 1, wherein, when the phase difference is determined to be within the predefined range, the transmitter is configured to enable a video line inversion where the transmitter inverts the subset of the plurality of video lines of the second portion of the video signal.

10. The video system according to claim 9, wherein the transmitter is configured to enable the video line inversion by being manually configured.

11. The video system according to claim 9, wherein the receiver logic is further configured to receive an indication indicating whether the video line inversion is enabled in the transmitter.

12. A video system, comprising a transmitter having:
    a transmitter logic, configured to:
       generate a transmit output video signal (Tx output) based on a transmit input video signal (Tx input) by inverting a subset of a plurality of video lines of the Tx input, where the Tx output is generated in response to a receiver determining that a noise signal added to the Tx output during transmission from the transmitter to the receiver would result in visible degradation and the transmitter receiving an indication from the receiver to generate the Tx output by inverting the subset of the plurality of video lines of the Tx input, and
       provide an indication to the receiver that the subset of the plurality of video lines are inverted; and
    a signal transmission circuit, configured to transmit the Tx output to the receiver in analog format over a wired connection.

13. The video system according to claim 12, further comprising the receiver, the receiver comprising:
    a signal reception circuit, configured to receive a receive input video signal (Rx input), the Rx input being indicative of the Tx output; and
    a receiver logic, configured to:
       receive the indication that the subset of the plurality of video lines in the Tx output are inverted, and
       generate a receive output video signal (Rx output) based on the Rx input by invert the subset of the plurality of video lines of the Rx input.

14. The video system according to claim 12, the receiver determines that the noise signal added to the Tx output during transmission from the transmitter to the receiver would result in visible degradation by determining that a phase difference between the noise signal in a first video line of the Tx output received by the receiver and the noise signal in a second video line of the Tx output received by the receiver is within a predefined range.

15. The video system according to claim 14, wherein the phase difference is within the predefined range when an absolute value of the phase difference is less than 90 degrees.

16. A video system for communicating, in analog format, video signals over a video link, the system comprising:
    a receiver; and
    a transmitter,
    wherein:
       the transmitter includes a signal transmission circuit, configured to transmit a first portion and a second portion of a video signal to the receiver,
       the receiver includes a signal reception circuit, configured to receive the first portion and the second portion of the video signal transmitted by the signal transmission circuit,
       the receiver further includes a receiver logic, configured to:
          determine a line-to-line phase difference of a periodic noise signal in the first portion of the video signal received by the signal reception circuit,
          when the line-to-line phase difference is within a predefined range, provide an indication to the transmitter to generate the second portion of the video signal by inverting a subset of a plurality of video lines of a transmit input video signal (Tx input) prior to transmitting the second portion of the video signal to the receiver, and invert the subset of the plurality of video lines of the second portion of the video signal received by the signal reception circuit.

17. The video system according to claim 16, wherein the predefined range is between −90 degrees and +90 degrees.

18. The video system according to claim 16, wherein the subset of the plurality of video lines of the video signal includes every second line of active pixel values of the second portion of the video signal.

19. The video system according to claim 16, wherein the transmitter is configured to provide to the receiver an indication that a line inversion in the transmitter is enabled when the transmitter inverts the subset of the plurality of video lines to generate the second portion of the video signal prior to transmitting the second portion of the video signal to the receiver.

20. The video system according to claim 16, wherein the line-to-line phase difference is within the predefined range when an absolute value of the line-to-line phase difference is less than 90 degrees.

\* \* \* \* \*

UNITED STATES PATENT AND TRADEMARK OFFICE
CERTIFICATE OF CORRECTION

PATENT NO. : 10,645,337 B1
APPLICATION NO. : 16/398575
DATED : May 5, 2020
INVENTOR(S) : Mullins et al.

Page 1 of 1

It is certified that error appears in the above-identified patent and that said Letters Patent is hereby corrected as shown below:

On the Title Page

Item (73), delete "ANALONG DEVICES INTERNATIONAL UNLIMITED COMPANY, Limerick (IE)" and insert -- "ANALOG DEVICES INTERNATIONAL UNLIMITED COMPANY, Limerick (IE)" --.

Signed and Sealed this
Thirtieth Day of June, 2020

Andrei Iancu
*Director of the United States Patent and Trademark Office*